US012339727B2

(12) United States Patent
Choi

(10) Patent No.: US 12,339,727 B2
(45) Date of Patent: Jun. 24, 2025

(54) ELECTRONIC DEVICE FOR SUPPORTING TARGET WAKE TIME MODE OR POWER SAVING MODE AND METHOD OF OPERATING THE SAME

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 18/339,977

(22) Filed: Jun. 22, 2023

(65) Prior Publication Data
US 2024/0019922 A1    Jan. 18, 2024

Related U.S. Application Data

(63) Continuation of application No. PCT/KR2023/006215, filed on May 8, 2023.

(30) Foreign Application Priority Data

Jul. 18, 2022  (KR) .................. 10-2022-0088569
Nov. 3, 2022   (KR) .................. 10-2022-0145496

(51) Int. Cl.
   *G06F 1/3234*        (2019.01)
(52) U.S. Cl.
   CPC .................. *G06F 1/3234* (2013.01)
(58) Field of Classification Search
   CPC . H04W 52/02; H04W 52/0216; H04W 76/27; H04W 84/12; G06F 1/3234; G06F 1/3209; G06F 1/3287; G06F 1/3278
   See application file for complete search history.

(56) References Cited

U.S. PATENT DOCUMENTS 10,194,391 B2    1/2019  Asterjadhi et al.
10,453,094 B2   10/2019  Lee et al.
              (Continued)

FOREIGN PATENT DOCUMENTS

EP         2076081 A1      7/2009
KR    10-2009-0068453 A    6/2009
              (Continued)

OTHER PUBLICATIONS

International Search Report & Written Opinion for PCT/KR2023/006215 by Korean Intellectual Property Office dated Jul. 26, 2023.

*Primary Examiner* — Raymond N Phan
(74) *Attorney, Agent, or Firm* — BROADVIEW IP LAW, PC

(57) ABSTRACT

Disclosed is an electronic device includes: a communication circuit configured to transmit or receive data over at least one link set up between an external electronic device and the electronic device; and a processor configured to: identify time intervals between packets that are transmitted or received over the at least one link; identify a ratio of time intervals that are equal to or less than a designated value among the time intervals; select a target wake time (TWT) mode or a power saving mode, wherein in the TWT mode the communication circuit is switched to an active state every designated time and wherein in the power saving mode the communication circuit is switched to an inactive state in case that the packet is not transmitted or received during a designated time; and control the communication circuit on the basis of the selected mode.

18 Claims, 14 Drawing Sheets

(56) References Cited

U.S. PATENT DOCUMENTS

| | | |
|---|---|---|
| 10,904,829 B2 | 1/2021 | Kneckt et al. |
| 11,006,313 B2 | 5/2021 | Nam et al. |
| 11,039,498 B2 | 6/2021 | Jeon |
| 11,153,921 B2 | 10/2021 | Hsu et al. |
| 11,206,184 B2 | 12/2021 | Choi et al. |
| 11,622,331 B2 | 4/2023 | Liu |
| 2008/0076485 A1* | 3/2008 | Lee ................. H04W 52/029 455/574 |
| 2010/0144299 A1* | 6/2010 | Ren .................. H04W 52/0232 455/226.1 |
| 2013/0188541 A1 | 7/2013 | Fischer |
| 2016/0323820 A1* | 11/2016 | Wong ................ H04W 52/0209 |
| 2021/0329547 A1 | 10/2021 | Kim et al. |
| 2022/0141680 A1 | 5/2022 | Min et al. |
| 2022/0217638 A1 | 7/2022 | Nayak et al. |
| 2023/0319711 A1 | 10/2023 | Uppala et al. |

FOREIGN PATENT DOCUMENTS

| | | |
|---|---|---|
| KR | 10-2016-0110006 A | 9/2016 |
| KR | 10-2018-0123391 A | 11/2018 |
| KR | 10-2020-0072209 A | 6/2020 |
| KR | 10-2020-0108309 A | 9/2020 |
| KR | 10-2362757 B1 | 2/2022 |

\* cited by examiner

ELECTRONIC DEVICE FOR SUPPORTING TARGET WAKE TIME MODE OR POWER SAVING MODE AND METHOD OF OPERATING THE SAME

CROSS-REFERENCE TO RELATED APPLICATION(S)

This application is a continuation of International Application No. PCT/KR2023/006215, filed on May 8, 2023, which is based on and claims the benefit of Korean Patent Application No. 10-2022-0088569 filed on Jul. 18, 2022, and Korean Patent Application No. 10-2022-0145496 filed on Nov. 3, 2022, in the Korean Intellectual Property Office, the entire contents of which are hereby incorporated by reference.

TECHNICAL FIELD

Various embodiments of the present disclosure generally relate to an electronic device and a method of operating the electronic device, and more specifically to a wireless communication technology that supports a TWT mode or a power saving mode.

BACKGROUND ART

The proliferation of various electronic devices has led to significant speed improvements in wireless communications, which in turn enables various electronic devices to make full use of it. Of the wireless communications supported by recent electronic devices, a wireless local network (WLAN) or Wi-Fi compliant to IEEE 802.11 standard enables high-speed wireless connectivity across a variety of electronic devices. While the first implementations of Wi-Fi could support transmission rates of up to 1 to 9 Mbps, the Wi-Fi 6 technology (or IEEE 802.11 ax) can support transmission rates of up to about 10 Gbps.

The electronic device may support various services using relatively large amounts of data (e.g., UHD quality video streaming services, augmented reality (AR) services, virtual reality (VR) services, and/or mixed reality (MR) services) using wireless communications that support high transmission rates.

The IEEE 802.11ax standard has introduced a target wake time (TWT) function to improve the battery performance of various electronic devices that connect to an access point (AP). The TWT function may be a function that transmits or receives data between the electronic device and the AP for designated time (target wake time duration). The electronic device may transmit or receive data during designated time and may not transmit or receive data during time outside of the designated time. The TWT function is emerging as a function that may reduce the power consumption of short-range wireless communication in the electronic device.

In addition, the IEEE 802.11 be (or Wi-Fi 7) standard is expected to introduce a technology that supports multi-link operation (MLO) to increase the speed and reduce the latency of data transmission and reception. Electronic devices that support multi-link operation are expected to realize relatively high transmission rates and low latency by allowing data to be transmitted or received over a plurality of links.

An electronic device may, for designated time (or TWT duration), activate a communication circuit supporting short-range wireless communication, receive data transmitted by an external electronic device (or AP), or transmit data to an external electronic device. The electronic device may deactivate the communication circuit outside of the designated time. The electronic devices that support a TWT mode may reduce power consumption by deactivating the communication circuit outside of the designated time.

The electronic device may support a power saving mode in which the communication circuit supporting a short range wireless communication is switched to an idle state (or, a deactivated state, a doze state) in case that transmission or reception of a packet does not occur for a designated time after completion of transmission or reception of the packet. By switching the communication circuit to the idle state, the electronic device may reduce power consumption caused by maintaining the communication circuit in an active state even when there is no transmission or reception of packets.

In a situation where the time interval between transmitted or received packets is relatively long (or where intermittent traffic of relatively high volume occurs), the electronic device, in case of operating in the TWT mode, may cause relatively high power consumption by switching the communication circuit to an active state even when there are no packets to be transmitted or received.

SOLUTIONS

An electronic device according to various embodiments of the present disclosure may include a communication circuit configured to transmit or receive data over at least one link generated between an external electronic device and the electronic device. The electronic device may include a processor. The processor may identify time intervals between packets that are transmitted or received over the at least one link. The processor may identify a ratio of the time intervals that are equal to or less than a designated value among the time intervals. The processor may select one of a target wake time (TWT) mode in which the communication circuit is switched to an active state every designated time on the basis of the ratio, and a power saving mode in which the communication circuit is switched to an inactive state in case that no transmission or reception of the packets occurs during the designated time. The processor may be configured to control the communication circuit on the basis of the selected mode.

A method of operating an electronic device according to various embodiments of the present disclosure may include identifying time intervals between packets that are transmitted or received over at least one link generated between an external electronic device and the electronic device. The method may include identifying a ratio of a time interval among the time intervals that is equal to or less than a designated value to a time interval among the time intervals that is equal to or greater than the designated value. The method may include selecting one of a target wake time (TWT) mode in which the communication circuit of the electronic device is switched to an active state every designated time on the basis of the ratio, and a power saving mode in which the communication circuit is switched to an inactive state in case that no transmission or reception of the packets occurs during the designated time. The method may include controlling the communication circuit on the basis of the selected mode.

An electronic device and a method of operation of the electronic device may select a TWT mode or a power saving mode based on a ratio of time intervals, which are equal to or less than a specified value, of packets transmitted or received over at least one link.

An electronic device may achieve higher power efficiency compared to the TWT mode, which activates the communication circuit every designated period by selecting a power saving mode in case that the ratio of time intervals, which are equal to or less than a specified value, of packets transmitted or received over the at least one link is equal to or greater than a designated magnitude.

An electronic device may achieve higher power efficiency compared to the power saving mode that fails to enter an inactive mode due to relatively frequent packet transmission or reception by selecting the TWT mode in case that a ratio of time intervals, which are equal to or less than a specified value, of packets transmitted or received over at least one link is equal to or less than a designated magnitude.

DETAILED DESCRIPTION

Figure 1:
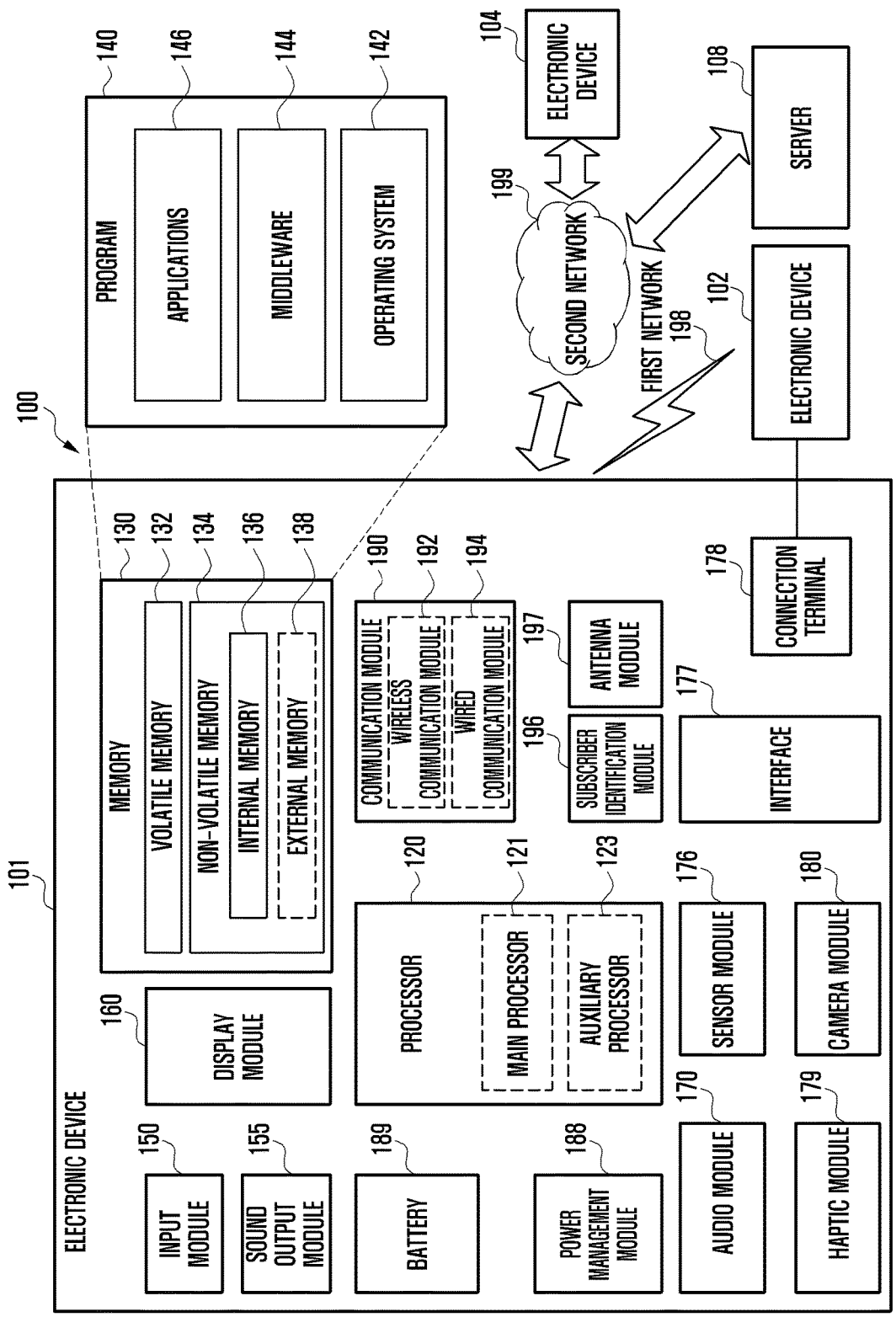
FIG. 1 is a block diagram illustrating an electronic device, according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
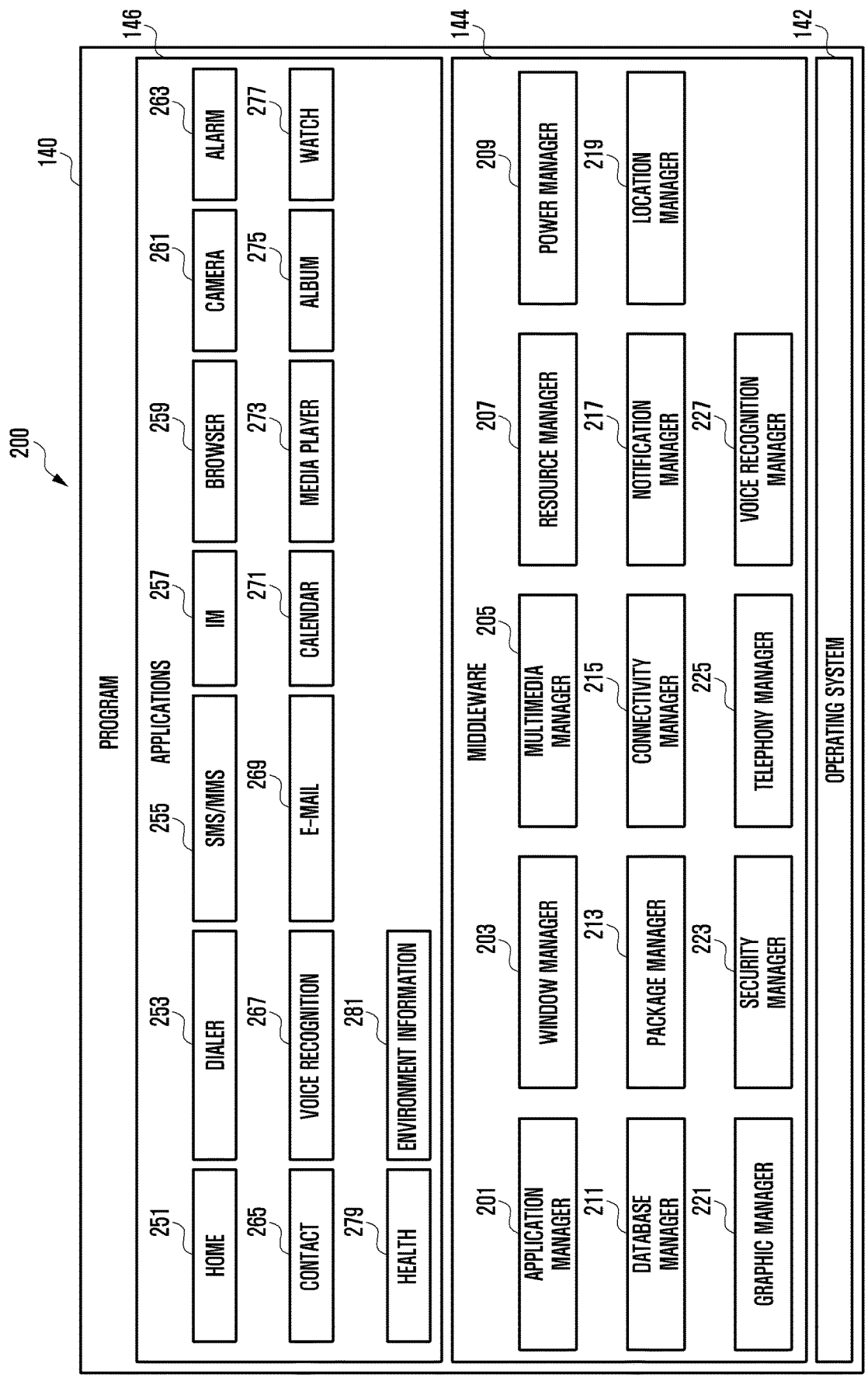
FIG. 2 is a block diagram illustrating a program according to various embodiments of the present disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
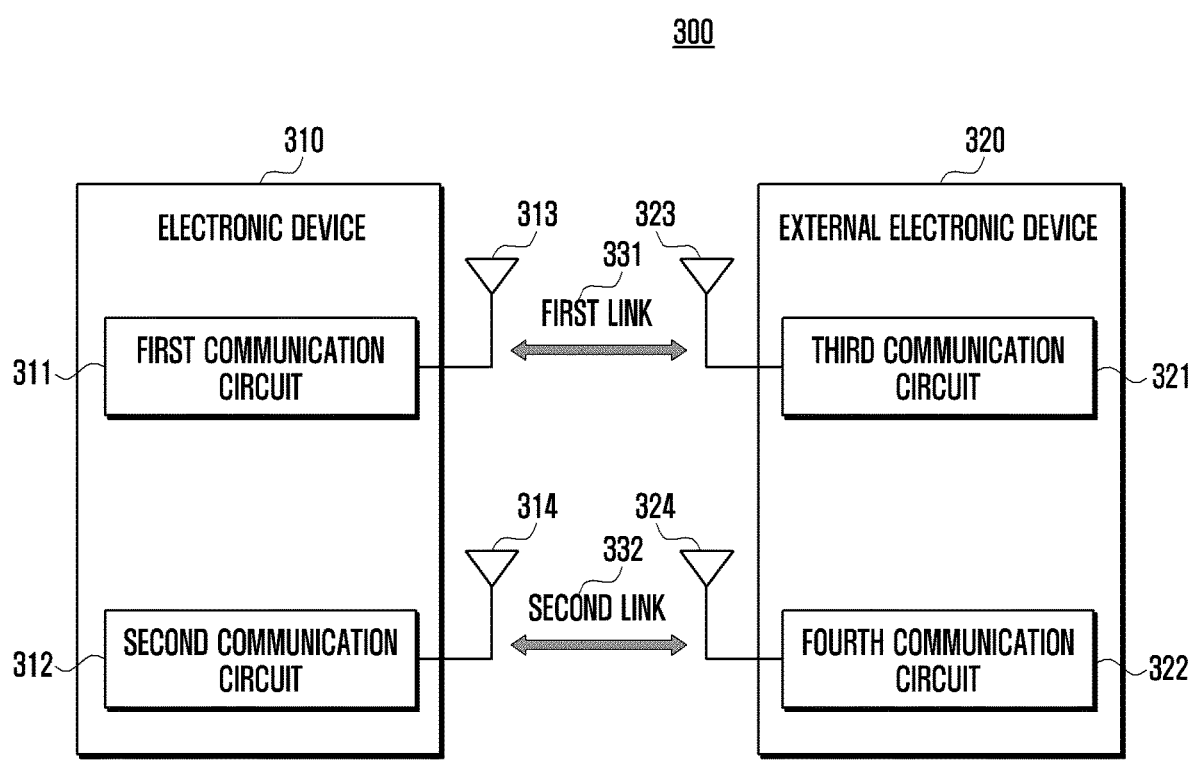
FIG. 3 is a diagram illustrating an embodiment in which the electronic device and an external electronic device operate in multi-link operation (MLO) according to various embodiments of the present disclosure.

FIG. 3 is a diagram illustrating an embodiment in which an electronic device and an access point (AP) operate in multi-link operation (MLO) mode according to various embodiments of the present disclosure.

With reference to FIG. 3, a wireless LAN system 300 may include an electronic device 310 and/or an external electronic device 320. According to an embodiment, the electronic device 310 may perform wireless communication with the external electronic device 320 through short-range wireless communication. The wireless communication may refer to a variety of communication methods that the electronic device 310 and/or the external electronic device 320 may support. For example, the wireless communication may be Wi-Fi. The external electronic device 320 may serve as a base station that provides wireless communication to at least one electronic device 310 located within the communication radius of the wireless LAN system 300. As an example, the external electronic device 320 may include an access point (AP) compliant to IEEE 802.11 standard. The electronic device 310 may include a station (STA) compliant to IEEE 802.11 standard.

According to various embodiments of the present disclosure, the electronic device 310 and/or the external electronic device 320 may support multi-link operation (MLO). The multi-link operation may be a mode of operation that transmits or receives data over a plurality of links (e.g., a first link 331 and a second link 332). The multi-link operation may be a mode of operation in which data is transmitted or received over a plurality of links based on a plurality of bands or channels.

According to various embodiments of the present disclosure, the electronic device 310 may include a plurality of communication circuits (e.g., a first communication circuit 311 and/or a second communication circuit 312) to support the multi-link operation. The first communication circuit 311 may transmit data to the external electronic device 320 via the first link 331 or receive data transmitted by the external electronic device 320 via the first link 331. The first communication circuit 311 may output or receive a signal in a frequency band corresponding to the first link 331 via a first antenna 313. The second communication circuit 312 may transmit data to the external electronic device 320 via the second link 332, or may receive data transmitted by the external electronic device 320 via the second link 332. The second communication circuit 312 may output or receive a signal in a frequency band corresponding to the second link 332 via the second antenna 314. The first communication circuit 311 and/or the second communication circuit 312 may be integrated into a single communication circuit.

According to various embodiments of the present disclosure, the external electronic device 320 may include a plurality of communication circuits (e.g., a third communication circuit 321 and/or a fourth communication circuit 322) to support the multi-link operation. The third communication circuit 321 may transmit data to the electronic device 310 via the first link 331 or receive data transmitted by the electronic device 310 via the first link 331. The third communication circuit 321 may output or receive a signal in a frequency band corresponding to the first link 331 via a third antenna 323. The fourth communication circuit 322 may transmit data to the electronic device 310 via the second link 332, or may receive data transmitted by the electronic device 310 via the second link 332. The fourth communication circuit 322 may output or receive a signal in a frequency band corresponding to the second link 332 via a fourth antenna 324. The third communication circuit 321 and/or the fourth communication circuit 322 may be integrated into a single communication circuit.

According to various embodiments of the present disclosure, a frequency band of the first link 331 and a frequency band of the second link 333 may be different. For example, the first link 331 may have a frequency band of 2.5 GHz, and the second link 332 may have a frequency band of 5 GHz or 6 GHz.

According to various embodiments of the present disclosure, the first link 331 and the second link 332 may utilize electronic devices other than the electronic device 310. The electronic device 310 may support a carrier sense multiple access with collision avoidance (CSMA/CA) scheme to prevent a situation in which the electronic device 310 and another electronic device are simultaneously transmitting or receiving data over the same link. The CSMA/CA scheme may be a scheme in which data is transmitted when a particular link is in an idle state. The electronic device 310 supporting CSMA/CA may detect whether another electronic device is transmitting data over a particular link, and in case that the electronic device 310 detects that data is being transmitted by another electronic device, the electronic device 310 may wait and defer transmitting data over the particular link. In response to detecting that another electronic device is not transmitting data over a particular link, the electronic device 310 supporting CSMA/CA may transmit data over the particular link in a specified manner (e.g., by activating a timer and transmitting data when the timer expires). As described above, the electronic device 310 may perform data transmission and/or reception using a particular link without conflict with other electronic devices.

According to various embodiments of the present disclosure, the first link 331 and/or the second link 332 supported by the multi-link operation may independently support CSMA/CA.

The electronic device 310 supporting the CSMA/CA scheme may determine whether a particular link is in an idle state before transmitting data. The electronic device 310 may transmit data over a particular link that is in an idle state.

The electronic device 310 may determine whether the first link 331 is in an idle state based on information related to the idle state of the first link 331 included in data that the external electronic device 320 transmits. The information related to the idle state of the first link 331 may include a clear channel assessment (CCA) state field and/or a network allocation vector (NAV) configuration field. The information related to an idle state of the first link 331 may be included in a Request to Send (RTS) message that requests permission for data transmission over the first link 331, a Clear to Send (CTS) message that indicates that data reception over the first link 331 is ready. The electronic device 310 may identify whether a particular link is in an idle state with reference to the clear channel assessment (CCA) state field and/or the network allocation vector (NAV) configuration field. The electronic device 310 may determine, by reference to the CCA state field, whether the first link 331 is physically in an idle state, and by reference to the NAV configuration field, whether the first link 331 is logically in an idle state. In response to determining that the first link 331 is in an idle state, the electronic device 310 may activate a timer and transmit data over the first link 331 to an external electronic device 320 when a designated time has expired.

The electronic device 310 may determine whether the second link 332 is in an idle state based on information related to the idle state of the second link 332 included in data that the external electronic device 320 transmits. Information related to an idle state of the second link 332 may include a clear channel assessment (CCA) state field and/or a network allocation vector (NAV) configuration field. The information related to the idle state of the second link 332 may be included in a Request to Send (RTS) message that requests permission for data transmission over the second link 332, a Clear to Send (CTS) message that indicates that data reception over the second link 332 is ready. The electronic device 310 may determine whether a particular link is in an idle state with reference to the clear channel assessment (CCA) state field and/or the network allocation vector (NAV) configuration field. The electronic device 310 may determine, by reference to the CCA state field, whether the second link 332 is physically in an idle state, and by reference to the NAV configuration field, whether the second link 332 is logically in an idle state. In response to determining that a particular link is in an idle state, the electronic device 310 may activate a timer and transmit data over the second link 332 to an external electronic device 320 when a designated time has expires.

Figure 4A:
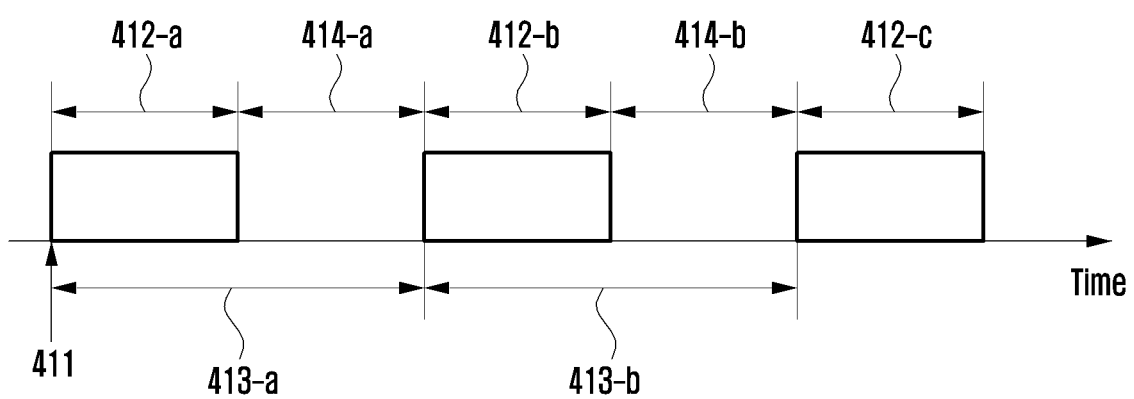
FIG. 4A is a diagram illustrating an embodiment in which the electronic device, according to various embodiments of the present disclosure controls a communication circuit based on target wake time (TWT).

FIG. 4A is a diagram illustrating an embodiment in which the electronic device controls a communication circuit based on target wake time (TWT).

An electronic device (e.g., the electronic device 310 in FIG. 3) may support target wake time (TWT) in which the electronic device receives and/or transmits data at designated times and does not receive and/or transmit data outside the designated times.

The TWT is a function proposed in IEEE 802.11 standard that allows electronic devices to transmit and/or receive data over short-range wireless communication during designated time, and to reduce the power consumed in performing short-range wireless communication by switching to an idle state (or an inactive state) outside the designated time.

The electronic device 310, while connected to the external electronic device 320, may negotiate with the external electronic device 320 to enable the TWT function and configure TWT parameters. The TWT parameters may be parameters that are required to perform the TWT function. According to an embodiment, the TWT parameters may include at least one of: target wake time 411 which indicates a point in time of activation of data transmission and/or reception; TWT durations (or TWT service periods (SPs)) 412-a, 412-b, and 412-c which each indicate a duration in which data transmission and/or reception may be performed; and/or TWT wake intervals 413-a and 413-b which each indicate an interval between a point in time of activation of data transmission and/or reception and a point in time of next activation of data transmission and/or reception.

The electronic device 310 may transmit the generated TWT parameters to the external electronic device 320 in a negotiation process related to the activation of the TWT function. The external electronic device 320 may transmit data to the electronic device 310 for a particular period of time (e.g., 412-a, 412-b, and/or 412-c) on the basis of the TWT parameters.

The electronic device 310 may transmit data to the external electronic device 320 for a particular period of time (e.g., 412-a, 412-b, and/or 412-c). The electronic device 310 may activate communication circuits (e.g., the first communication circuit 311 and/or the second communication circuit 312 in FIG. 3) for a particular period of time (e.g., 412-a, 412-b, and/or 412-c), and deactivate the communication circuits 311 and 312 for other period of time (e.g., 414-a and/or 414-b). Thereby, power consumption by the communication circuits 311, 312 may be reduced.

The electronic device 310 that supports transmission and/or reception of data over a plurality of links (e.g., the first link 331 and/or the second link 332 in FIG. 3) may configure the TWT function for each link. According to an embodiment, the electronic device 310 may utilize all of the plurality of links to transmit and/or receive data during the same period of time, with the TWT function of the plurality of links activated.

Figure 4B:
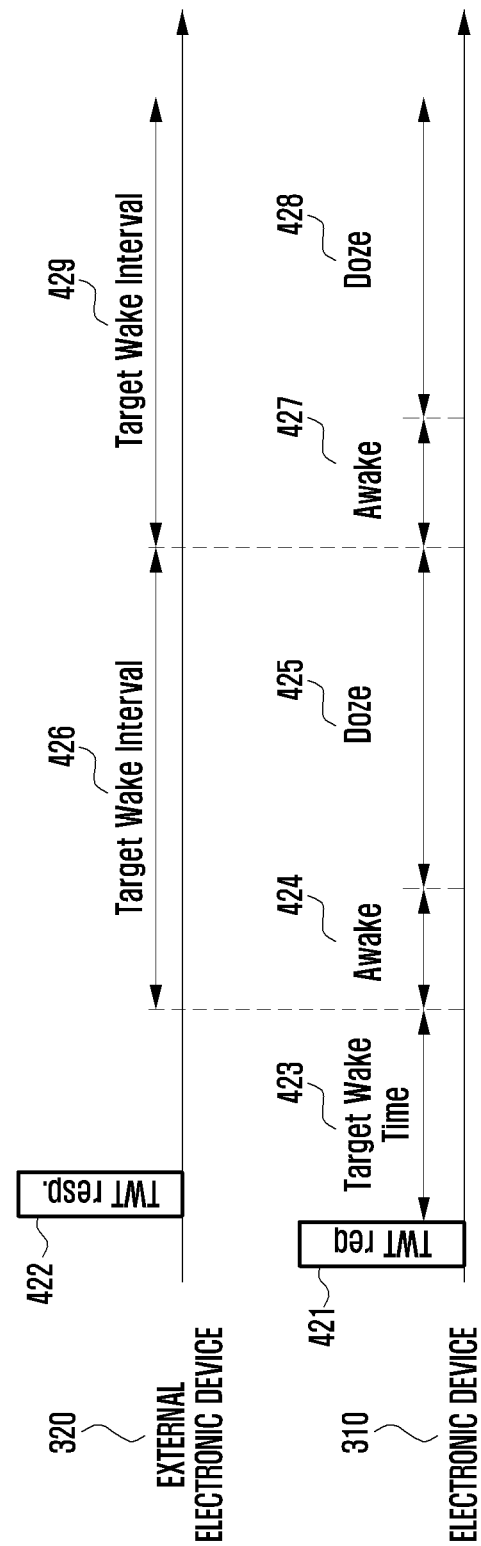
FIG. 4B is a diagram illustrating an embodiment in which the electronic device and the external electronic device perform a TWT operation, according to various embodiments of the present disclosure.

FIG. 4B is a diagram illustrating an embodiment in which the electronic device performs a TWT operation.

The electronic device 310 (e.g., the electronic device 310 in FIG. 3), while connected to the external electronic device 320 (e.g., the external electronic device 320 in FIG. 3), may negotiate with the external electronic device 320 to activate the TWT function and configure the TWT parameters. The electronic device 310 may transmit a TWT request message 421 which requests the TWT negotiation to the external electronic device 320 to activate the TWT function. The TWT request message 421 may include the TWT parameters generated by the electronic device 310. The TWT parameters may be parameters that are required to perform the TWT function. According to an embodiment, the TWT parameters may include at least one of: target wake time 423 which indicates a point in time of activation of data transmission and/or reception; TWT durations (or TWT service periods (SPs)) 424 and 427 which each indicate a duration in which data transmission and/or reception may be performed; and/or TWT wake intervals 426 and 429 which each indicate an interval between a point in time of activation of data transmission and/or reception and a point in time of next activation of data transmission and/or reception.

The external electronic device 320 may receive the TWT request message 421, modify the TWT parameters included in the TWT request message 421 (or leave the TWT parameters unchanged), and transmit a TWT response message 422 including the modified TWT parameters (or the same as the TWT parameters included in the TWT request message 421) to the electronic device 310.

The electronic device 310 may perform an operation based on the TWT parameters included in the TWT response message.

The electronic device 310 may transmit data to the external electronic device 320 during particular periods of time 424 and 427. The electronic device 310 may activate the communication circuit (e.g., the wireless communication module 192 in FIG. 1) during particular periods of time 424 and 427, and deactivate the communication circuit 192 during other periods of time 425 and 428, thereby reducing the power consumed by the communication circuit 192.

Figure 4C:
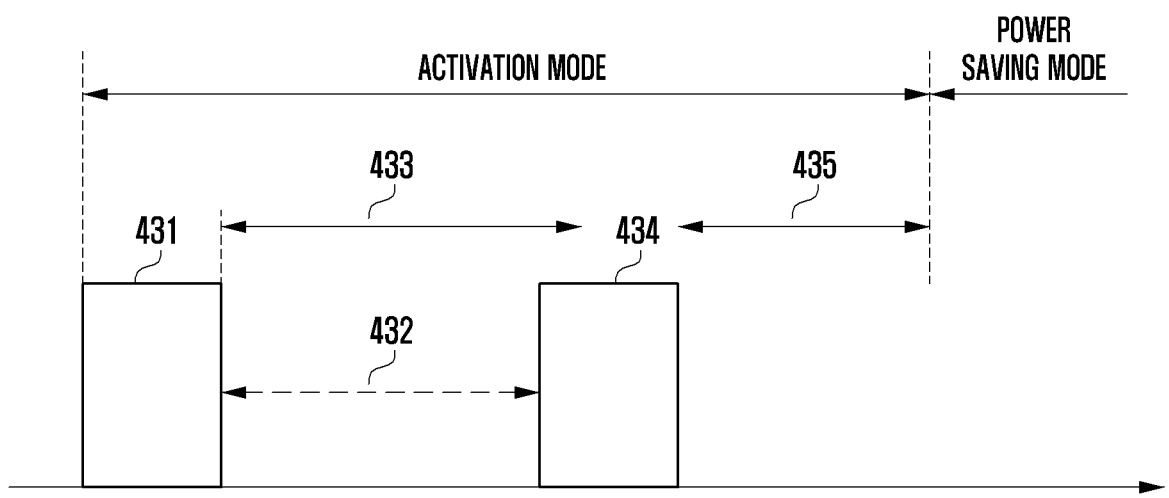
FIG. 4C is a diagram illustrating an embodiment in which the electronic device, according to various embodiments of the present disclosure, controls a communication circuit based on a power saving mode.

FIG. 4C is a diagram illustrating an embodiment in which the electronic device controls a communication circuit based on a power saving mode.

The electronic device (e.g., the electronic device 310 in FIG. 3) may support a power saving mode in which the communication circuit supporting a short range wireless communication is switched to an idle state (or, a deactivated state, a doze state) in case that transmission or reception of a packet does not occur for a designated period of time after completion of transmission or reception of a packet. By switching the communication circuit to the idle state, the electronic device 310 may reduce power consumption caused by maintaining the communication circuit in an active state even when there is no transmission or reception of packets taking place.

The electronic device 310 may activate a counter that may count designated time 433 upon completion of transmission or reception of a packet 431. The electronic device 310 may identify (or monitor) whether the transmission or reception of a packet occurs during the designated time 433. The electronic device 310 may keep the communication circuit active (or not switch to an idle state) until the designated time 433 expires.

With reference to FIG. 4C, the electronic device 310 may detect that the transmission or reception of the packet 434 occurs after predetermined time 432 upon completion of the transmission or reception of the packet 431. The predetermined time 432 may be less than the designated time 433 assigned to the counter. The electronic device 310 may keep the communication circuit active and/or deactivate the counter, and transmit or receive the packet 434.

The electronic device 310 may, upon completion of transmission or reception of the packet 434, reactivate the counter and identify (or monitor) whether transmission or reception of the packet occurs during designated time 435.

The electronic device 310 may determine that no transmission or reception of packets has occurred during the designated time 435 assigned to the counter, and may switch the communication circuit to an idle state based on the expiration of the designated time 435. The electronic device 310 may reduce power consumption by switching the communication circuit to an idle state.

The electronic device 310 may switch the communication circuit back to an active state and perform the transmission or reception of the packet based on detecting that the transmission or reception of the packet takes place.

The electronic device 310 may identify a traffic indication map (TIM) element that is included in a beacon transmitted by the external electronic device (e.g., the external electronic device 320 in FIG. 3) and that indicates the presence of a packet to be transmitted by the external electronic device 320 to the electronic device 310, switch the communication circuit back to an active state, and receive the packet from the external electronic device 320.

Figure 4D:
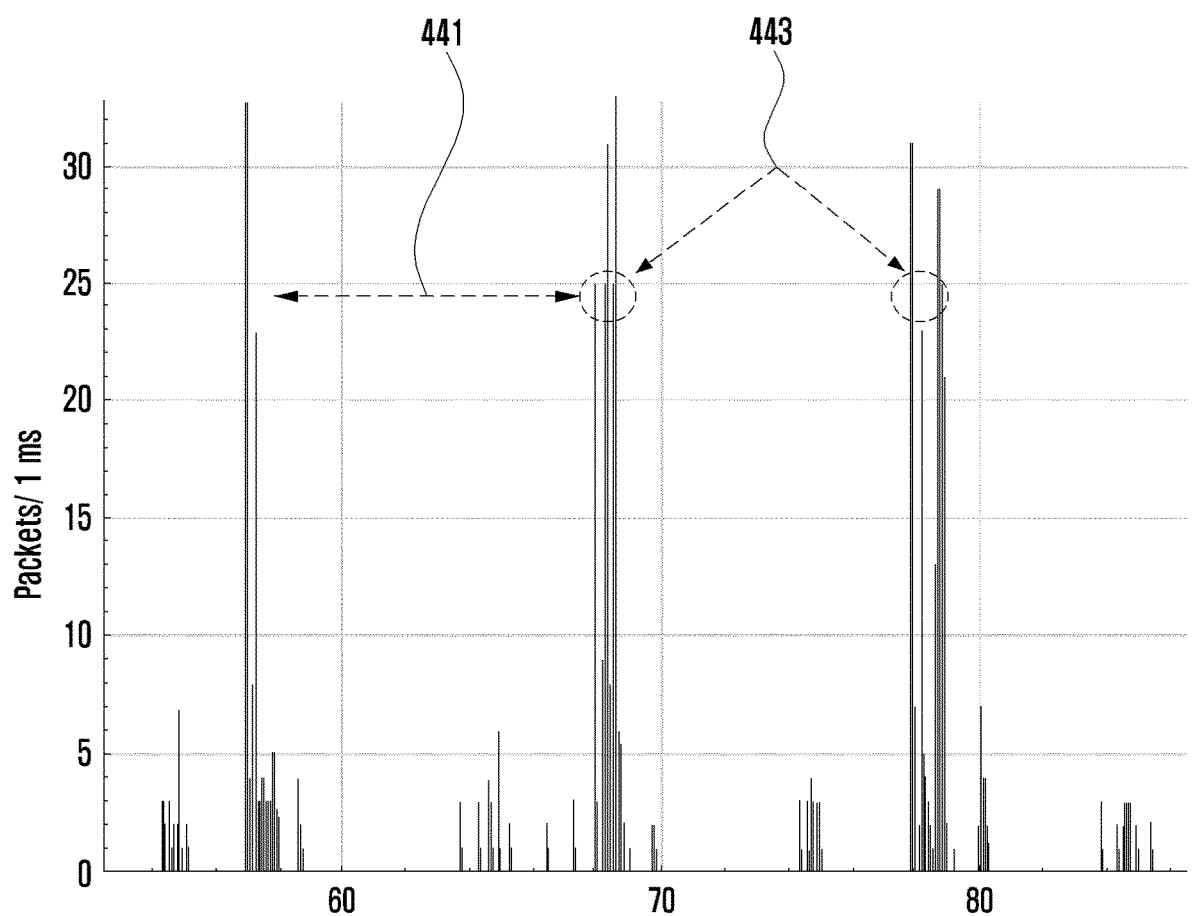
FIG. 4D is a diagram illustrating an embodiment in which the electronic device, according to various embodiments of the present disclosure controls a communication circuit based on one of the TWT mode or power saving mode.

FIG. 4D is a diagram illustrating an embodiment in which the electronic device controls a communication circuit based on the TWT mode or power saving mode.

The electronic device (e.g., the electronic device 310 in FIG. 3) may transmit or receive the packet using the TWT mode illustrated in FIG. 4B or the power saving mode illustrated in FIG. 4C.

In a situation 443 in which a time interval between the transmitted or received packets is relatively short, it may be possible for the electronic device 310 to transmit or receive the packets using the TWT mode to implement relatively low power consumption compared to for the electronic device 310 to transmit or receive the packets using the power saving mode. In case that the electronic device 310 is operating in the power saving mode with a relatively short time interval between packets, the electronic device 310 may transmit or receive packets before the counter in the power saving mode expires, thereby preventing the communication circuit from entering an idle state.

In a situation 441 in which the time interval between the transmitted or received packets is relatively long (or in which intermittent traffic of relatively large volume occurs), transmitting or receiving packets by the electronic device 310 using the power saving mode may implement relatively low power consumption compared to transmitting or receiving packets using the TWT mode. In a situation in which the time interval between transmitted or received packets is relatively long, the electronic device 310, in case of operating in the TWT mode, may cause relatively high power consumption by switching the communication circuit to an active state even when there are no transmission or reception of packets.

Hereinafter, an embodiment in which high power efficiency may be realized by selecting the TWT mode or the power saving mode based on the time interval of the transmitted or received packets is described.

Figure 5:
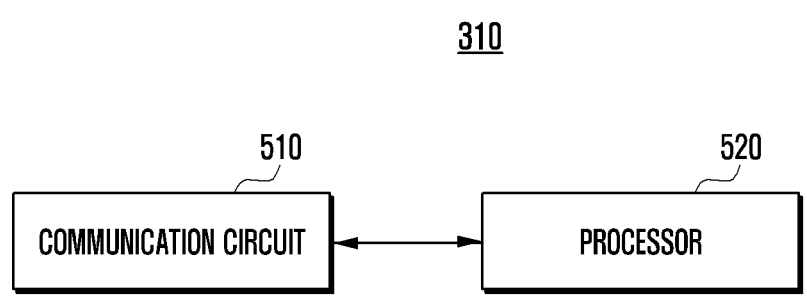
FIG. 5 is a block diagram of the electronic device according to various embodiments of the present disclosure.

FIG. 5 is a block diagram of the electronic device according to various embodiments of the present disclosure.

The electronic device (e.g., the electronic device 310 in FIG. 3) may include a communication circuit 510 (e.g., the first communication circuit 311 or the second communication circuit 312 in FIG. 4B) and/or a processor 520 (e.g., the processor 120 in FIG. 1).

The communication circuit 510 may include various circuit structures used for modulation and/or demodulation of signals within the electronic device 310. For example, the communication circuit 510 may modulate a signal in the baseband into a signal in the radio frequency (RF) band to be outputted through the antenna (not illustrated), or demodulate a signal in the RF band received through the antenna into a signal in the baseband to be transmitted to the processor 520.

The communication circuit 510 may receive the packets transmitted by the external electronic device (e.g., the external electronic device 320 in FIG. 3) over the at least one link, or may transmit the packets to the external electronic device 320.

The communication circuit 510 may also support multi-link operation (MLO). In case that the communication circuit 510 supports the MLO, the communication circuit 510 may transmit a plurality of packets to the external electronic device (e.g., the external electronic device 320 in FIG. 3) via the first link (e.g., the first link 331 in FIG. 3) and/or receive data transmitted by the external electronic device 320 via the first link 331. The communication circuit 510 may transmit the packets to the external electronic device 320 via the second link (e.g., the second link 332 in FIG. 3), or may receive the packets transmitted by the external electronic device 320 via the second link 332. The communication circuit 510 may output or receive a signal in a frequency band corresponding to the first link 331 through the antenna (not illustrated), and may output or receive a signal in a frequency band corresponding to the second link 332 through the antenna (not illustrated). The frequency band of the first link 331 and the frequency band of the second link 333 may be different. For example, the first link 331 may have a frequency band of 2.5 GHz, and the second link 332 may have a frequency band of 5 GHz or 6 GHz.

The communication circuit 510 may support the TWT mode and/or the power saving mode. The TWT mode may be a mode in which packets may be transmitted or received by activating the communication circuit 510 every designated time (e.g., the target wake time 423 in FIG. 4B) and keeping the communication circuit 510 active for a designated duration (e.g., the TWT service period (SP) 424 and 427 in FIG. 4B). The power saving mode may be a mode that transitions the communication circuit 510 to an inactive state in case that no transmission or reception of packets occurs for the designated time (e.g., the designated time 433 in FIG. 4C). The communication circuit 510 may operate in either the TWT mode or the power saving mode based on a control of the processor 520.

The processor 520 may perform an operation to generate packets for receiving data transmitted by the application processor (e.g., the processor 120 in FIG. 1) and transmitting the received data to the external electronic device 320. The processor 520 may be defined as a communication processor included in a communication module (e.g., the wireless communication module 192 in FIG. 1). According to an embodiment, the processor 520 may perform channel coding based on data transmitted by an application processor (e.g., the application processor 120 in FIG. 1) to generate packets, identify whether at least a portion of the data transmitted by the external electronic device 320 is in error, or, in case that errors have occurred, perform an operation to repair the errors (e.g., a hybrid auto repeat request (HARD)).

The processor 520, operatively coupled to the communication circuit 510, may control an operation of the communication circuit 510. The processor 520 may receive the data transmitted by the application processor 120 and select a link to utilize to transmit or receive packets corresponding to the data, on the basis of characteristics of services included in the data.

The processor 520 may control the communication circuit 510 using any one of the TWT mode and the power saving mode. In selecting any one of the TWT mode and the power saving mode, the processor 520 may select any one of the TWT mode and the power saving mode based on a time interval between packets being transmitted or received over at least one link (e.g., the first link 331).

The processor 520 may identify a time interval between packets being transmitted or received over at least one link (e.g., the first link 331).

The time interval between packets may refer to an interval between a first time point substantially equal to a time point at which the transmission or reception of a packet is completed and a second time point substantially equal to a time point at which the transmission or reception of the next packet begins.

The processor 520 may identify a time interval that has a value equal to or less than (or less than) a designated value among the time intervals between packets.

The designated magnitude is a value generated on the basis of a value assigned to a timer that is activated in the power saving mode, and may be the same or similar to the value assigned to the timer.

In case that the time interval between packets is greater than the value assigned to the timer configured in the power saving mode, the control of the communication circuit 510 using the power saving mode may achieve higher power efficiency compared to the control of the communication circuit 510 using the TWT mode.

In case that the time interval between packets is less than the value assigned to the timer configured in the TWT mode, the control of the communication circuit 510 using the TWT mode may achieve higher power efficiency compared to the control of the communication circuit 510 using the power saving mode.

The processor 520 may identify a ratio of the time interval that have a value equal to or less than (or less than) a designated magnitude among the time intervals between packets.

The ratio of time intervals may be a ratio a sum of time intervals equal to or less than (or less than) the designated magnitude to a total sum of time intervals between packets. Alternatively, the ratio of time intervals may be a ratio of the number of time intervals equal to or less than (or, less than) the designated magnitude to the number of time intervals between packets.

The processor 520 may select any one of the TWT mode and the power saving mode based on the identified ratio.

The processor 520 may select the TWT mode based on determining that the identified ratio is equal to (or greater than) the designated value (e.g., 0.5). A situation in which the identified ratio is equal to or greater than (or, greater than) the designated value may refer to a relatively frequent occurrence of a state in which the time intervals between packets is less than the value assigned to the timer configured in the power saving mode. And in case that a state in which the time intervals between packets is less than the value assigned to the timer configured in the power saving mode occurs relatively frequently, the control of the communication circuit 510 using the TWT mode may achieve a higher power efficiency compared to the control of the communication circuit 510 using the power saving mode.

The processor 520 may select the power saving mode on the basis of identifying that the identified ratio is equal to or less than (or less than) the designated value (e.g., 0.5). A situation in which the identified ratio is equal to or less than (or, less than) the designated value may refer to a relatively frequent occurrence of a state in which the time intervals between packets is greater than the value assigned to the timer configured in the power saving mode. And in case that a state in which the time intervals between packets is greater than the value assigned to the timer configured in the power saving mode occurs relatively frequently, the control of the communication circuit 510 using the power saving mode may implement a higher power efficiency compared to the control of the communication circuit 510 using the TWT mode.

The processor 520 may control the communication circuit 510 on the basis of the selected mode.

According to an embodiment, the processor 520 may select the TWT mode, based on identifying that the identified ratio is equal to or greater than (or greater than) the designated value (e.g., 0.5), and control the communication circuit 510 to operate in the TWT mode.

The processor 520 may perform TWT negotiation with the external electronic device (e.g., the external electronic device 320 in FIG. 3) to support the target wake time (TWT) function.

The processor 520 may generate TWT parameters during the TWT negotiation process. According to an embodiment, the processor 520 may generate the TWT parameters based on the state of the electronic device 310. The state of the electronic device 310 may include at least any one of an amount of data (or, traffic) to be transmitted or received by the electronic device 310, a quality of service (QoS) requirement, or a contention level of at least any one link of a plurality of links.

The processor 520 may generate the TWT parameters including at least one of: the target wake time (e.g., 411 in FIG. 4A) which indicates a point in time of activation of data transmission and/or reception; the TWT durations (e.g., 412-a, 412-b, and 412-c in FIG. 4A) which each indicate a duration in which data transmission and/or reception may be performed; and/or the TWT wake intervals (e.g., 413-a and 413-b in FIG. 4A) which each indicate an interval between a point in time of activation of data transmission and/or reception and a point in time of next activation of data transmission and/or reception.

The processor 520 may generate the TWT duration having a relatively long length and/or the TWT wake interval having a relatively short length, on the basis of performing a service that requires relatively high volume of data transfer and relatively low latency. Alternatively, the processor 520 may generate the TWT duration having a relatively short length and/or the TWT wake interval having a relatively long length, on the basis of performing a service that does not require relatively small volume of data transfer and relatively low latency.

The processor 520 may transmit a TWT negotiation message including the generated TWT parameters to the external electronic device 320.

The processor 520 may select the power saving mode, based on determining that the identified ratio is equal to or less than (or less than) the designated value (e.g., 0.5), and control the communication circuit 510 to operate in the power saving mode.

The processor 520 may control the communication circuit 510 to transmit information, indicating that the electronic device 310 is operating in the power saving mode, to the external electronic device 320 upon operating in the power saving mode. The processor 520, while operating in a power saving mode, may activate the communication circuit 510 for some period of time to receive data (or, beacons) transmitted by the external electronic device 320. The external electronic device 320 may store packets to be transmitted to the electronic device 310 in a buffer implemented internally in the external electronic device 320, in response to receiving information indicating that the electronic device 310 is operating in the power saving mode. The external electronic device 320 may transmit a beacon or an action frame to the electronic device 310 that includes information indicating the presence of a packet to be transmitted to the electronic device 310. The electronic device 310 may transition to an active state of the communication circuit 510 (or maintain an active state of the communication circuit 510) upon receiving a beacon or action frame including information indicating the presence of a packet to be transmitted, while the communication circuit 510 is active for some duration.

A situation in which the identified ratio is equal to or less than (or, less than) the designated value may refer to a relatively frequent occurrence of a state in which the time intervals between packets is greater than the value assigned to the timer configured in the power saving mode. And in case that a state in which the time intervals between packets is greater than the value assigned to the timer configured in the power saving mode occurs relatively frequently, the control of the communication circuit 510 using the power saving mode may achieve a higher power efficiency compared to the control of the communication circuit 510 using the TWT mode.

The processor 520 may attain lower power consumption by selecting an appropriate mode of the TWT mode or the power saving mode depending on situations, using the operations described above.

The processor 520 may continuously monitor the ratio and adjust the mode of operation based on changes in a condition related to the ratio that is equal to or greater than (or greater than) the designated value. For example, the processor 520 may control the communication circuit 510 to switch from the TWT mode to the power saving mode when the processor 520 identifies that the ratio decreases from a value equal to or greater than the designated value (e.g., 0.5) to a value equal to or less than the designated value.

Alternatively, processor 520 may receive information indicating the mode of operation from the application processor 120 and select either the TWT mode or the power saving mode based on the information indicating the mode of operation. According to an example, the application processor 120 may monitor packets that are transmitted to the processor 520. The application processor 120 may identify a ratio of the time interval that has a value equal to or less than (or less than) a designated magnitude among the time intervals between packets transmitted to the processor 520. The application processor 120 may change the mode of operation when a condition related to whether the identified ratio is equal to or greater than (or greater than) the designated value changes. For example, the application processor 510 may transmit information instructing the processor 520 to switch from the TWT mode to the power saving mode when the application processor 510 identifies that the ratio decreases from a value equal to or greater than the designated value (e.g., 0.5) to a value equal to or less than the designated value. The processor 520 may control the communication circuit 510 to switch from the TWT mode to the power saving mode in response to receiving information instructing the processor 520 to switch from the TWT mode to the power saving mode. For example, the application processor 510 may transmit information instructing the processor 520 to switch from the power saving mode to the TWT mode when the application processor 510 identifies that the ratio increases from a value equal to or less than the designated value (e.g., 0.5) to a value equal to or greater than the designated value. The processor 520 may control the communication circuit 510 to switch from the power saving mode to the TWT mode in response to receiving information instructing the processor 520 to switch from the power saving mode to the TWT mode.

With respect to the embodiment described above, the processor 520 may determine whether to perform an operation that selects any one of the TWT modes and the power saving mode on the basis of the percentage of time intervals having a value equal to or less than the designated magnitude among the time intervals between packets transmitted or received on the basis of a type of service running on the electronic device 500.

According to an embodiment, the processor 520 may determine to perform the operation that selects any one of the TWT modes and the power saving mode on the basis of the percentage of time intervals having a value equal to or less than the designated magnitude among the time intervals between packets transmitted or received on the basis of identifying that the type of service running on the electronic device 500 is a designated type of service.

The type of service may refer to a type of service that is determined by traffic identifier (TID) as defined in IEEE 802.11 standard. According to one embodiment, the type of service may include a first type (e.g., voice data type (AC_VO), video data type (AC_VI)) that requires a relatively high transmission rate or low latency (e.g., real-time) and/or a second type (e.g., background (AC_BK) and/or best effort (AC_BE)) that is a type of service that may be performed at a relatively low transmission rate or high latency compared to the first type.

According to an example, the processor 520 may receive information indicating a type of service from the application processor 120. The application processor 120 may identify the type of service running on the electronic device 500 based on the type of protocol used to transmit or receive the packets (e.g., user datagram protocol (UDP), transmission control protocol (TCP)), information about a port used to transmit or receive the packets, and/or identifying information on the application transmitting the packets. The processor 520 may receive information indicating the type of service transmitted by the application processor 120 and identify whether the type of service running on the electronic device 500 is either a first type or a second type.

According to an embodiment, the processor 520 may determine to perform the operation that selects any one of the TWT modes and the power saving mode on the basis of the percentage of time intervals having a value equal to or less than the designated magnitude among the time intervals between packets transmitted or received when the type of service running on the electronic device 500 is the second type.

According to an embodiment, the processor 520 may determine not to perform the operation that selects any one of the TWT modes and the power saving mode on the basis of the percentage of time intervals having a value equal to or less than the designated magnitude among the time intervals between packets transmitted or received when the type of service running on the electronic device 500 is the first type. The processor 520 may control the communication circuit 510 using the TWT mode, regardless of the ratio of the time intervals, on the basis of identifying that the type of service running on the electronic device 500 is the first type.

According to an embodiment, the processor 520 may perform the operation that selects any one of the TWT modes and the power saving mode on the basis of the percentage of time intervals having a value equal to or less than the designated magnitude among the time intervals between packets transmitted or received regardless of the type of service running on the electronic device 500.

While the embodiments described above illustrate the use of the time interval of packets transmitted or received over a single link, the embodiments may also be applicable in case that the electronic device 500 supports transmitting or receiving packets over a plurality of links (or in case that the electronic device 500 supports MLO mode). Embodiments utilizing time intervals of packets transmitted or received over a plurality of links are described below in FIGS. 7A and 7B.

Figure 6A:
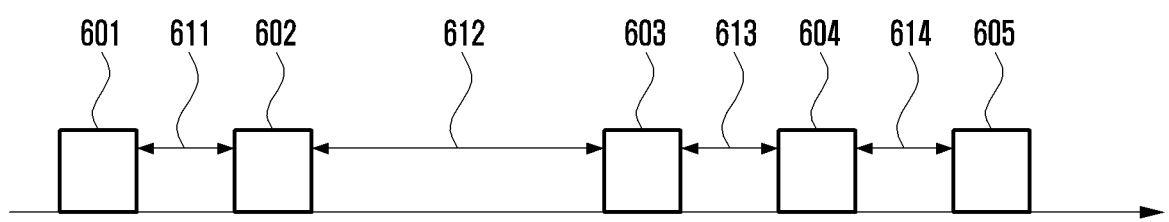
FIG. 6A is a diagram illustrating an embodiment of selecting any one of the power saving mode and the TWT mode based on a ratio of time intervals in a packet that are equal to or less than a designated value, in the electronic device according to various embodiments of the present disclosure.

FIG. 6A is a diagram illustrating an embodiment of selecting any one of the power saving mode and the TWT mode on the basis of a ratio of time intervals in a packet that are below a predetermined value, in the electronic device according to various embodiments of the present disclosure.

FIG. 6A illustrates packets 601, 602, 603, 604, and 605 that are transmitted or received over at least one link (e.g., the first link 331 in FIG. 3).

The electronic device (e.g., the electronic device 310 in FIG. 5) may control the communication circuit (e.g., the communication circuit 510 in FIG. 5) using either the TWT mode or the power saving mode. In selecting either the TWT mode or the power saving mode, the electronic device 310 may select either the TWT mode or the power saving mode based on time intervals 611, 612, 613, and 614 between the packets 601, 602, 603, 604, and 605 that are transmitted or received over the at least one link 331.

The processor 520 may identify the time intervals 611, 612, 613, and 614 between the packets 601, 602, 603, 604, 605 transmitted or received over the at least one link 331.

For convenience of explanation, it is assumed that time intervals 611, 613, and 614 out of the time intervals 611, 612, 613, and 614 are equal to or less than a designated value (e.g., a designated value assigned to the counter that is activated in the power saving mode), the time interval 612 is equal to or greater than the designated value, and the sum of lengths of time intervals 611, 613, and 614 is greater than the length of the time interval 612.

The processor 520 may identify the ratio of the time intervals 611, 612, 613, and 614 between the packets 601, 602, 603, 604, and 605 to the time intervals 611, 613, and 614 that are equal to or less (or less than) the designated magnitude.

The ratio of the time intervals may be a ratio of the sum of the time intervals 611, 613, and 614 equal to or less than (or less than) the designated magnitude to the total sum of the time intervals 611, 612, 613, and 614 between the packets 601, 602, 603, 604, and 605. Alternatively, the ratio of the time intervals may be a ratio of the number of the time intervals 611, 613, and 614 equal to or less than (or less than) the designated magnitude to the number of the time intervals 611, 612, 613, and 614 between the packets 601, 602, 603, 604, and 605.

The electronic device 310 may select any one of the TWT mode and the power saving mode on the basis of the identified ratio of the time intervals.

The electronic device 310 may select the TWT mode on the basis of identifying that the identified ratio is equal to (or greater than) the designated value (e.g., 0.5). A situation in which the identified ratio is equal to or greater than (or, greater than) the designated value may refer to a relatively frequent occurrence of a state in which the time intervals 611, 612, 613 and 614 between packets 601, 602, 603, 604 and 605 is less than the value assigned to the timer configured in the power saving mode. And in case that a state in which the time intervals 611, 612, 613 and 614 between packets 601, 602, 603, 604 and 605 is less than the value assigned to the timer configured in the power saving mode occurs relatively frequently, the control of the communication circuit 510 using the TWT mode may implement a higher power efficiency compared to the control of the communication circuit 510 using the power saving mode.

According to an embodiment, the electronic device 310 may select the TWT mode, on the basis of identifying that the identified ratio is equal to or greater than (or greater than) the designated value (e.g., 0.5), and control the communication circuit 510 to operate in the TWT mode.

The electronic device 310 may perform TWT negotiation with the external electronic device (e.g., the external electronic device 320 in FIG. 3) to support the target wake time (TWT) function.

The electronic device 310 may generate TWT parameters during the TWT negotiation process. According to an embodiment, the electronic device 310 may generate the TWT parameters based on the state of the electronic device 310. The state of the electronic device 310 may include at least any one of an amount of data (or, traffic) to be transmitted or received by the electronic device 310, a quality of service (QoS) requirement, or a contention level of at least any one link of a plurality of links.

The electronic device 310 may generate the TWT parameters including at least one of: the target wake time (e.g., 411 in FIG. 4A) which indicates a point in time of activation of data transmission and/or reception; the TWT durations (e.g., 412-a, 412-b, and 412-c in FIG. 4A) which each indicate a duration in which data transmission and/or reception may be performed; and/or the TWT wake intervals (e.g., 413-a and 413-b in FIG. 4A) which each indicate an interval between a point in time of activation of data transmission and/or reception and a point in time of next activation of data transmission and/or reception.

The electronic device 310 may generate the TWT duration having a relatively long length and/or the TWT wake interval having a relatively short length, based on performing a service that requires relatively high volume of data transfer and relatively low latency. Alternatively, the electronic device 310 may generate the TWT duration having a relatively short length and/or the TWT wake interval having a relatively long length, based on performing a service that does not require relatively high volume of data transfer and relatively low latency.

Figure 6B:
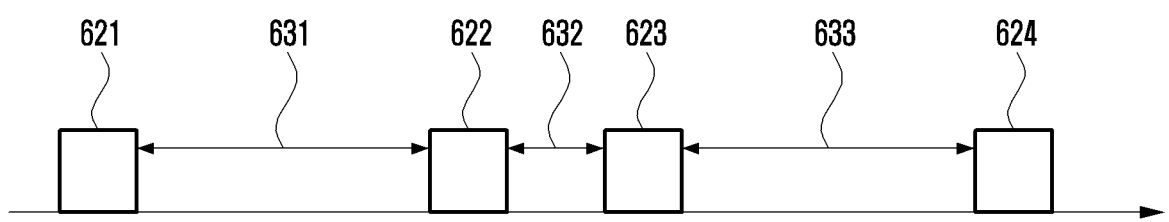
FIG. 6B is a diagram illustrating an embodiment of selecting any one of the power saving mode and the TWT mode based on a ratio of time intervals in a packet that are equal to or less than a designated value, in the electronic device according to various embodiments of the present disclosure.

FIG. 6B is a diagram illustrating an embodiment of selecting any one of the power saving mode and the TWT mode on the basis of a ratio of time intervals in a packet that are below a predetermined value, in the electronic device according to various embodiments of the present disclosure.

FIG. 6B illustrates packets 621, 622, 623, and 624 that are transmitted or received over at least one link (e.g., the first link 331 in FIG. 3).

The electronic device (e.g., the electronic device 310 in FIG. 5) may control the communication circuit (e.g., the communication circuit 510 in FIG. 5) using either the TWT mode or the power saving mode. In selecting either the TWT mode or the power saving mode, the electronic device 310 may select either the TWT mode or the power saving mode on the basis of time intervals 631, 632, and 633 between the packets 621, 622, 623, and 624 being transmitted or received over the at least one link 331.

The processor 520 may identify the time intervals 631, 632, and 633 between the packets 621, 622, 623, 624 transmitted or received over the at least one link 331.

For convenience of explanation, it is assumed that time intervals 631 and 633 out of the time intervals 631, 632, and 633 are equal to or greater than a designated value (e.g., a designated value assigned to the counter that is activated in the power saving mode), the time interval 632 is equal to or less than the designated value, and the sum of lengths of time intervals 631 and 633 is greater than the length of the time interval 632.

The processor 520 may identify the ratio of the time intervals 631, 632, and 633 between the packets 621, 622, 623, and 624 to the time interval 632 that are equal to or less (or less than) the designated magnitude.

The ratio of the time intervals may be a ratio of the sum of the time interval 632 equal to or less than (or less than) the designated magnitude to the total sum of the time intervals 631, 632, and 633 between the packets 621, 622, 623, and 624. Alternatively, the ratio of the time intervals may be a ratio of the number of the time interval 632 equal to or less than (or less than) the designated magnitude to the number of the time intervals 631, 632, and 633 between the packets 621, 622, 623, and 624.

The electronic device 310 may select any one of the TWT mode and the power saving mode on the basis of the identified ratio of the time intervals.

The electronic device 310 may select the power saving mode, on the basis of identifying that the identified ratio of time intervals is equal to or less than (or less than) the designated value (e.g., 0.5), and control the communication circuit 510 to operate in the power saving mode.

The electronic device 310 may control the communication circuit 510 to transmit information indicating that the electronic device 310 is operating in the power saving mode to the external electronic device 320 upon operating in the power saving mode. The electronic device 310, while operating in the power saving mode, may activate the communication circuit 510 for some period of time to receive data (or, beacons) transmitted by the external electronic device 320. The external electronic device 320 may store packets to be transmitted to the electronic device 310 in a buffer implemented internally in the external electronic device 320, in response to receiving information indicating that the electronic device 310 is operating in the power saving mode. The external electronic device 320 may transmit a beacon or an action frame to the electronic device 310 that includes information indicating the presence of a packet to be transmitted to the electronic device 310. The electronic device 310 may transition to an active state of the communication circuit 510 (or maintain an active state of the communication circuit 510) upon receiving a beacon or action frame including information indicating the presence of a packet to be transmitted, while the communication circuit 510 is active for some duration.

Figure 7A:
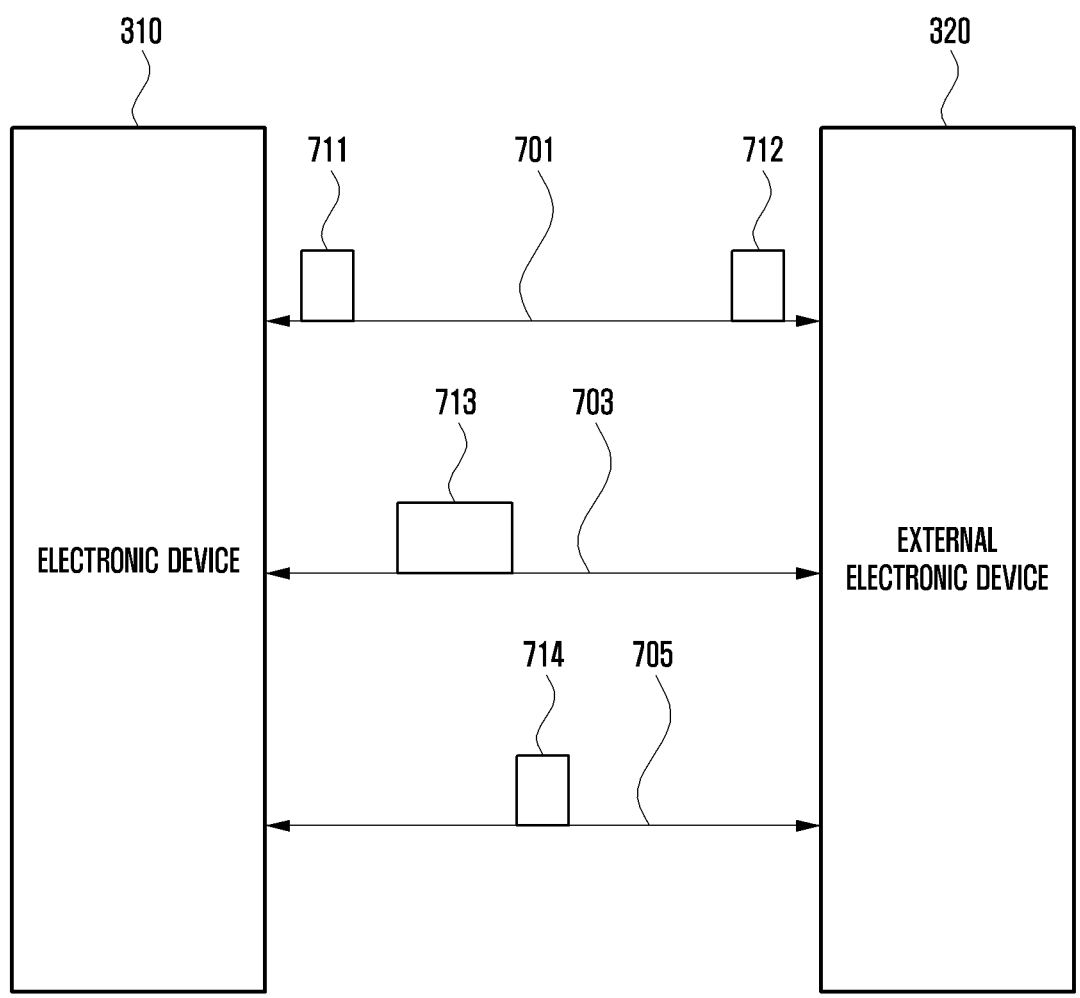
FIG. 7A is a diagram illustrating an embodiment of transmitting and/or receiving packets over a plurality of links in the electronic device in accordance with various embodiments of the present disclosure.

FIG. 7A is a diagram illustrating an embodiment of transmitting and/or receiving packets over a plurality of links in the electronic device in accordance with various embodiments of the present disclosure.

The electronic device (e.g., the electronic device 310 in FIG. 5) may support multi-link operation (MLO) in which transmission or reception of packets take place over a plurality of links.

The electronic device 310 may transmit or receive the packets to or from the external electronic device (e.g., the external electronic device 320 of FIG. 3) via a first link 701 (e.g., the first link 331 in FIG. 3), a second link 703 (e.g., the second link 332 in FIG. 3), and/or a third link 705.

With reference to FIG. 7A, the electronic device 310 may transmit or receive the first packet 711 and the second packet 712 to or from the external electronic device 320 via the first link 701. The electronic device 310 may transmit or receive the third packet 713 to or from the external electronic device 320 via the second link 703. The electronic device 310 may transmit or receive the fourth packet 714 to or from the external electronic device 320 via the third link 705.

For convenience of explanation, it is assumed that the first packet 711 is received or transmitted before the third packet 713, the third packet 713 is received or transmitted before the fourth packet 714, and the fourth packet 714 is received or transmitted before the second packet 712.

The electronic device 310 may identify time intervals of the packets transmitted or received over the first link 701, the second link 703, and/or the third link 705. The electronic device 310 may select either the TWT mode or the power saving mode and control the communication circuit 510 to allow the links targeted for identification to operate in the selected mode, on the basis of a ratio of the time intervals having a value equal to or less than the designated value.

The electronic device 310 may select the TWT mode on the basis that the identified ratio of the time intervals is equal to or greater (or greater than) the designated magnitude. The electronic device 310 may select the power saving mode on the basis that the identified ratio of the time intervals is equal to or less (or less than) the designated magnitude. A detailed example is described later in FIG. 7B.

Figure 7B:
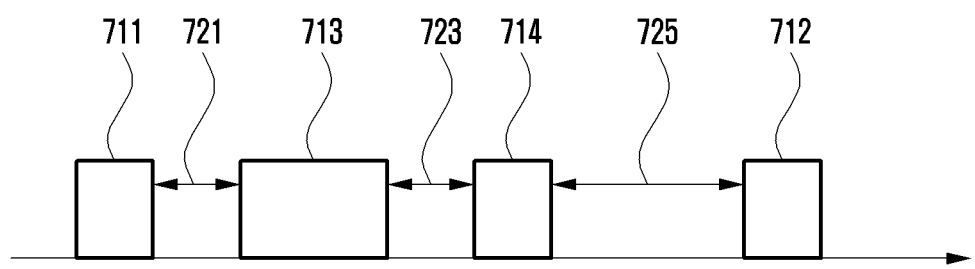
FIG. 7B is a diagram illustrating an embodiment of selecting any one of the power saving mode and the TWT mode based on a ratio of time intervals of packets transmitted or received over a plurality of links that are equal to or less than a designated value, in the electronic device according to various embodiments of the present disclosure.

FIG. 7B is a diagram illustrating an embodiment of selecting any one of the power saving mode and the TWT mode on the basis of a ratio of time intervals of packets transmitted or received over a plurality of links that are below a predetermined value, in the electronic device according to various embodiments of the present disclosure.

The electronic device (e.g., the electronic device 310 in FIG. 5) may identify time intervals of the packets transmitted or received over the first link 701, the second link 703, and/or the third link 705.

The electronic device 310 may identify the time interval 721 between the first packet 711 transmitted or received over the first link 701 and the third packet 713 transmitted or received over the second link 703.

The time interval 721 between the first packet 711 and the third packet 713 may refer to a time interval between a first time substantially equal to an ending point in time of transmission or reception of the first packet 711 and a second time substantially equal to a beginning point in time of transmission or reception of the third packet 713.

The electronic device 310 may identify whether the time interval 721 between the first packet 711 and the third packet 713 is equal to or less (or less than) the designated magnitude.

The designated magnitude is a value generated on the basis of a value assigned to a timer that is activated in the power saving mode, and may be the same or similar to the value assigned to the timer.

The electronic device 310 may identify the time interval 723 between the third packet 713 transmitted or received over the second link 703 and the fourth packet 714 transmitted or received over the third link 705.

The time interval 723 between the third packet 713 and the fourth packet 714 may refer to a time interval between a third time substantially equal to an ending point in time of transmission or reception of the third packet 713 and a fourth time substantially equal to a beginning point in time of transmission or reception of the fourth packet 714.

The electronic device 310 may identify whether the time interval 723 between the third packet 713 and the fourth packet 714 is equal to or less (or less than) the designated magnitude.

The electronic device 310 may identify the time interval 725 between the fourth packet 714 transmitted or received over the third link 705 and the second packet 712 transmitted or received over the first link 701.

The time interval 725 between the fourth packet 714 and the second packet 712 may refer to a time interval between a fifth time substantially equal to an ending point in time of transmission or reception of the fourth packet 714 and a sixth time substantially equal to a beginning point in time of transmission or reception of the second packet 712.

The electronic device 310 may identify whether the time interval 725 between the fourth packet 714 and the second packet 712 is equal to or less (or less than) the designated magnitude.

The electronic device 310 may select either the TWT mode or the power saving mode, and may control the communication circuit 510 to allow the links targeted for identification to operate in the selected mode, on the basis of a ratio of the time intervals and a time interval having a value equal to or less than the designated value.

The electronic device 310 may select the TWT mode on the basis that the identified ratio of the time intervals is equal to or greater (or greater than) the designated magnitude. The electronic device 310 may select the power saving mode on the basis that the identified ratio of the time intervals is equal to or less (or less than) the designated magnitude.

The electronic device 310 may select the TWT mode on the basis of identifying that the identified ratio of the time intervals is equal to (or greater than) the designated value (e.g., A situation in which the identified ratio is equal to or greater than (or, greater than) the designated value may refer to a relatively frequent occurrence of a state in which the time interval between packets is less than the value assigned to the timer configured in the power saving mode. And in case that a state in which the time interval between packets is less than the value assigned to the timer configured in the power saving mode occurs relatively frequently, the control of the communication circuit 510 using the TWT mode may implement a higher power efficiency compared to the control of the communication circuit 510 using the power saving mode.

The electronic device 310 may select the power saving mode on the basis of identifying that the identified ratio is equal to or less than (or less than) the designated value (e.g., 0.5). A situation in which the identified ratio is equal to or less than (or, less than) the designated value may refer to a relatively frequent occurrence of a state in which the time interval between packets is greater than the value assigned to the timer configured in the power saving mode. And in case that a state in which the time interval between packets is greater than the value assigned to the timer configured in the power saving mode occurs relatively frequently, the control of the communication circuit 510 using the power saving mode may implement a higher power efficiency compared to the control of the communication circuit 510 using the TWT mode.

According to an embodiment, the electronic device 310 may select the TWT mode, on the basis of identifying that the identified ratio is equal to or greater than (or greater than) the designated value (e.g., 0.5), and control the communication circuit 510 to operate in the TWT mode.

The electronic device 310 may perform TWT negotiation with the external electronic device (e.g., the external electronic device 320 in FIG. 3) to support the target wake time (TWT) function.

The electronic device 310 may generate TWT parameters during the TWT negotiation process. According to an embodiment, the processor 520 may generate the TWT parameters based on the state of the electronic device 310. The state of the electronic device 310 may include at least any one of an amount of data (or, traffic) to be transmitted or received, a quality of service (QoS) requirement, or a contention level of at least any one link of a plurality of links.

The electronic device 310 may generate the TWT parameters including at least one of: the target wake time (e.g., 411 in FIG. 4A) which indicates a point in time of activation of data transmission and/or reception; the TWT durations (e.g., 412-a, 412-b, and 412-c in FIG. 4A) which each indicate a duration in which data transmission and/or reception may be performed; and/or the TWT wake intervals (e.g., 413-a and 413-b in FIG. 4A) which each indicate an interval between a point in time of activation of data transmission and/or reception and a point in time of next activation of data transmission and/or reception.

The electronic device 310 may generate a TWT duration having a relatively long length and/or a TWT wake interval having a relatively short length, on the basis of performing a service that requires relatively high volume of data transfer and relatively low latency. Alternatively, the processor 520 may generate a TWT duration having a relatively short length and/or a TWT wake interval having a relatively long length, on the basis of performing a service that does not require relatively high volume of data transfer and relatively low latency.

The electronic device 310 may add information indicating a link to operate in the TWT mode to a message (or a beacon) including the TWT parameters. The link operating in the TWT mode may include a link over which packets targeted for identification in a time interval are transmitted or received.

In FIG. 7B, the first link 701, the second link 703, and/or the third link 705 may be links over which packets targeted for identification in a time interval are transmitted or received, and the message including the TWT parameters may include information indicating that the first link 701, second link 703, and/or third link 705 are/is operating in the TWT mode.

For another example, in case that the packets targeted for identification in the time interval are transmitted or received over the first link 701 and/or the second link 703, the message including the TWT parameters may include information indicating that the first link 701 and/or the second link 703 are/is operating in the TWT mode. Since the packets targeted for identification in the time interval are not transmitted or received over the link 705, the message including the TWT parameters may not include information indicating that the third link 705 is operating in the TWT mode.

Figure 8:
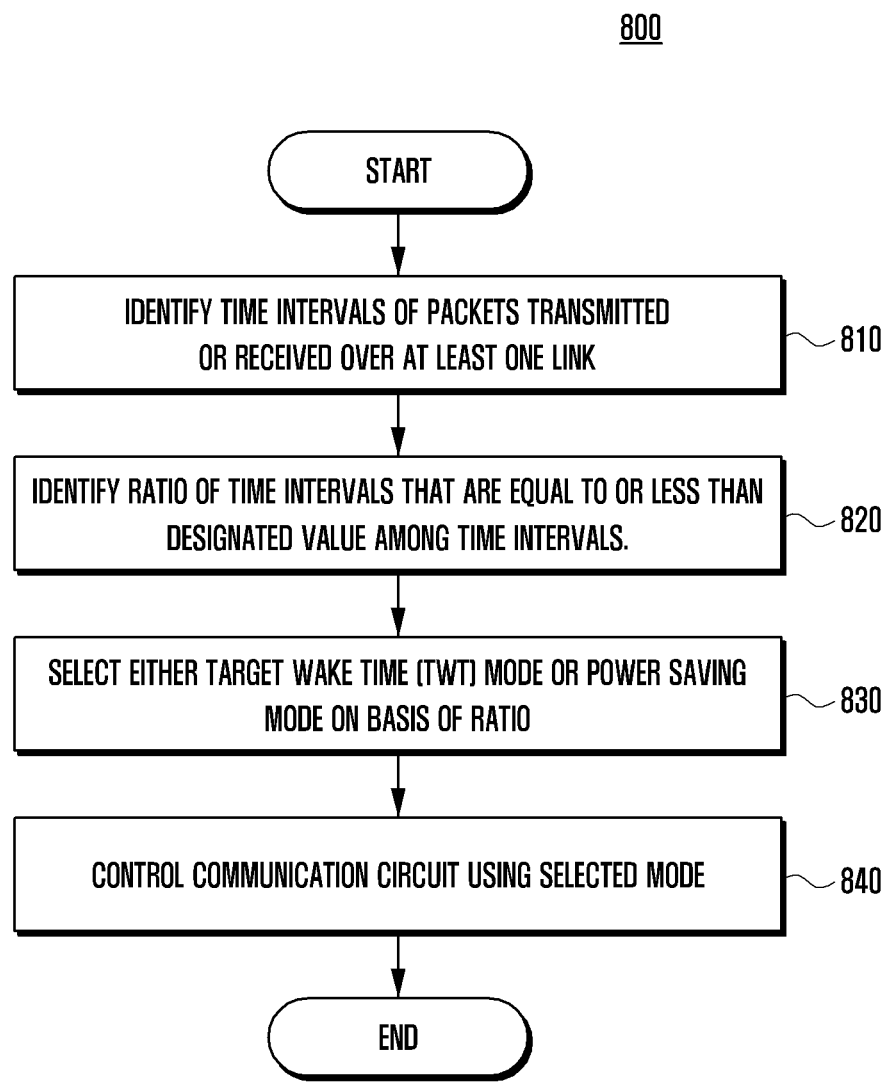
FIG. 8 is a flowchart illustrating a method of operating the electronic device according to various embodiments of the present disclosure.

FIG. 8 is a flowchart illustrating a method of operating the electronic device according to various embodiments of the present disclosure.

In operation 810, the electronic device (e.g., the electronic device 310 in FIG. 5) may identify time intervals of the packets being transmitted or received over the at least one link.

The time interval between packets may refer to an interval between the first time point substantially equal to a time point at which the transmission or reception of a packet is completed and the second time point substantially equal to a time point at which the transmission or reception of the next packet begins.

In operation 820, the electronic device 310 may identify the ratio of the time intervals that are equal to or less than the designated value among the time intervals.

The designated magnitude is a value generated on the basis of a value assigned to a timer that is activated in the power saving mode, and may be the same or similar to the value assigned to the timer.

In case that the time interval between packets is greater than the value assigned to the timer configured in the power saving mode, the control of the communication circuit 510 using the power saving mode may implement higher power efficiency compared to the control of the communication circuit 510 using the TWT mode.

In case that the time interval between packets is less than the value assigned to the timer configured in the power saving mode, the control of the communication circuit 510 using the TWT mode may implement higher power efficiency compared to the control of the communication circuit 510 using the power saving mode.

The electronic device 310 may identify a ratio of the time interval that has a value equal to or less than (or less than) a designated magnitude among the time intervals between packets.

The ratio of time intervals may be a ratio of a sum of time intervals equal to or less than (or less than) the designated magnitude to a total sum of time intervals between packets. Alternatively, the ratio of time intervals may be a ratio of the number of time intervals equal to or less than (or, less than) the designated magnitude to the number of time intervals between packets.

In operation 830, the electronic device 310 may select either the target wake time (TWT) mode or the power saving mode based on the identified ratio of the time intervals.

The electronic device 310 may select the TWT mode on the basis of identifying that the identified ratio of the time intervals is equal to or greater than (or greater than) the designated value (e.g., 0.5). A situation in which the identified ratio is equal to or greater than (or, greater than) the designated value may refer to a relatively frequent occurrence of a state in which the time interval between packets is less than the value assigned to the timer configured in the power saving mode. And in case that a state in which the time interval between packets is less than the value assigned to the timer configured in the power saving mode occurs relatively frequently, the control of the communication circuit 510 using the TWT mode may implement a higher power efficiency compared to the control of the communication circuit 510 using the power saving mode.

The electronic device 310 may select the power saving mode on the basis of identifying that the identified ratio of the time intervals is equal to or less than (or less than) the designated value (e.g., 0.5). A situation in which the identified ratio is equal to or less than (or, less than) the designated value may refer to a relatively frequent occurrence of a state in which the time interval between packets is greater than the value assigned to the timer configured in the power saving mode. And in case that a state in which the time interval between packets is greater than the value assigned to the timer configured in the power saving mode occurs relatively frequently, the control of the communication circuit 510 using the power saving mode may implement a higher power efficiency compared to the control of the communication circuit 510 using the TWT mode.

In operation 840, the electronic device 310 may control the communication circuit 510 using the selected mode.

According to an embodiment, the processor 520 may select the TWT mode, on the basis of identifying that the identified ratio of the time intervals is equal to or greater than (or greater than) the designated value (e.g., 0.5), and control the communication circuit 510 to operate in the TWT mode.

The electronic device 310 may perform TWT negotiation with the external electronic device (e.g., the external electronic device 320 in FIG. 3) to support the target wake time (TWT) function.

The electronic device 310 may generate TWT parameters during the TWT negotiation process. According to an embodiment, the processor 520 may generate the TWT parameters based on the state of the electronic device 310. The state of the electronic device 310 may include at least any one of an amount of data (or, traffic) to be transmitted or received, a quality of service (QoS) requirement, or a contention level of at least any one link of a plurality of links.

The electronic device 310 may generate the TWT parameters including at least one of: the target wake time (e.g., 411 in FIG. 4A) which indicates a point in time of activation of data transmission and/or reception; the TWT durations (e.g., 412-*a*, 412-*b*, and 412-*c* in FIG. 4A) which each indicate a duration in which data transmission and/or reception may be performed; and/or the TWT wake intervals (e.g., 413-*a* and 413-*b* in FIG. 4A) which each indicate an interval between a point in time of activation of data transmission and/or reception and a point in time of next activation of data transmission and/or reception.

The electronic device 310 may generate the TWT duration having a relatively long length and/or the TWT wake interval having a relatively short length, on the basis of performing a service that requires relatively high volume of data transfer and relatively low latency. Alternatively, the processor 520 may generate the TWT duration having a relatively short length and/or the TWT wake interval having a relatively long length, on the basis of performing a service that does not require relatively high volume of data transfer and relatively low latency.

The electronic device 310 may transmit a TWT negotiation message including the generated TWT parameters to the external electronic device 320.

The electronic device 310 may select the power saving mode, on the basis of identifying that the identified ratio of the time intervals is equal to or less than (or less than) the designated value (e.g., 0.5), and control the communication circuit 510 to operate in the power saving mode.

The electronic device 310 may control the communication circuit 510 to transmit information indicating that the electronic device 310 is operating in the power saving mode to the external electronic device 320 upon operating in the power saving mode. The electronic device 310, while operating in the power saving mode, may activate the communication circuit 510 for some period of time to receive data (or, beacons) transmitted by the external electronic device 320. The external electronic device 320 may store packets to be transmitted to the electronic device 310 in a buffer implemented internally in the external electronic device 320, in response to receiving information indicating that the electronic device 310 is operating in the power saving mode. The external electronic device 320 may transmit a beacon or an action frame to the electronic device 310 that includes information indicating the presence of a packet to be transmitted to the electronic device 310. The electronic device 310 may transition to an active state of the communication circuit 510 (or maintain an active state of the communication circuit 510) upon receiving a beacon or action frame including information indicating the presence of a packet to be transmitted, while the communication circuit 510 is active for some duration.

A situation in which the identified ratio is equal to or less than (or, less than) the designated value may refer to a relatively frequent occurrence of a state in which the time intervals between packets is greater than the value assigned to the timer configured in the power saving mode. And in case that a state in which the time intervals between packets is greater than the value assigned to the timer configured in the power saving mode occurs relatively frequently, the control of the communication circuit 510 using the power saving mode may implement a higher power efficiency compared to the control of the communication circuit 510 using the TWT mode.

Figure 9:
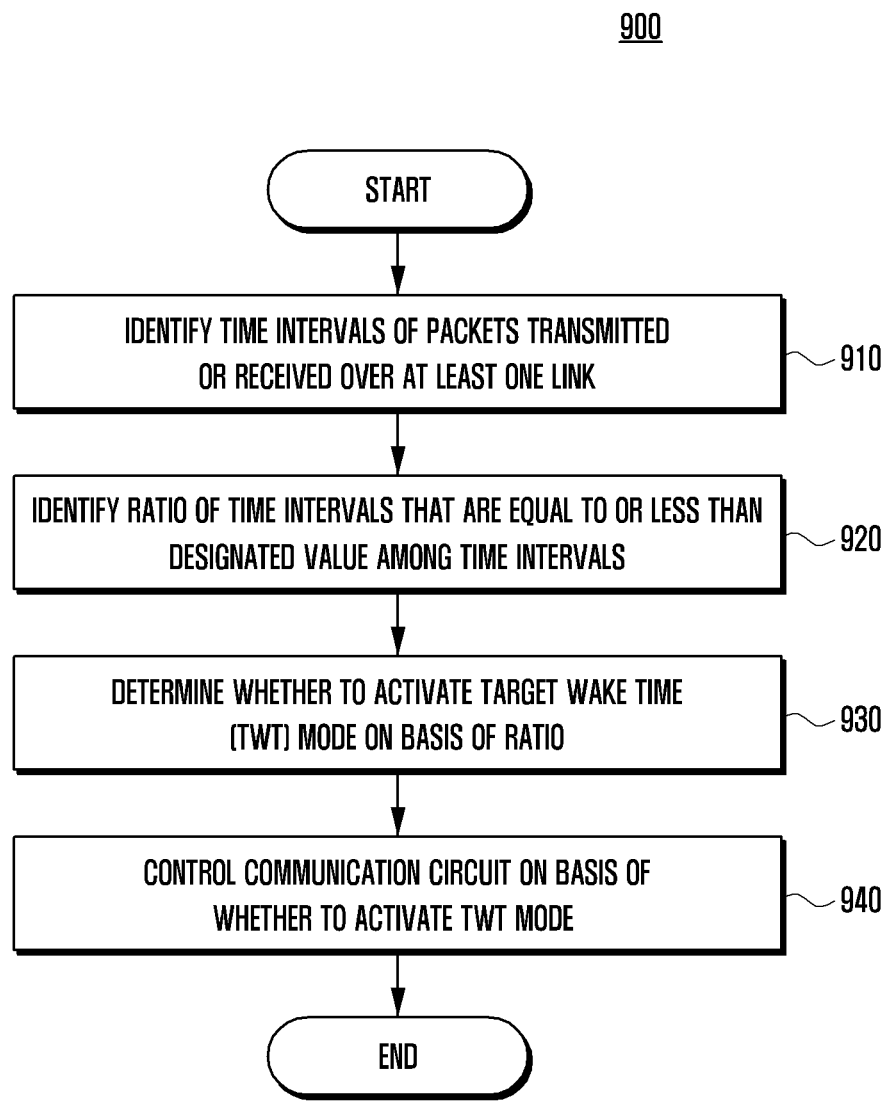
FIG. 9 is a flowchart illustrating a method of operating the electronic device according to various embodiments of the present disclosure.

FIG. 9 is a flowchart illustrating a method of operating the electronic device according to various embodiments of the present disclosure.

In operation 910, the electronic device (e.g., the electronic device 310 in FIG. 5) may identify time intervals of the packets being transmitted or received over the at least one link.

The time interval between packets may refer to an interval between the first time point substantially equal to a time point at which the transmission or reception of a packet is completed and the second time point substantially equal to a time point at which the transmission or reception of the next packet begins.

In operation 920, the electronic device 310 may identify the ratio of the time intervals that are equal to or less than the designated value among the time intervals.

The designated magnitude is a value generated on the basis of a value assigned to a timer that is activated in the power saving mode, and may be the same or similar to the value assigned to the timer.

In case that the time interval between packets is greater than the value assigned to the timer configured in the power saving mode, the control of the communication circuit 510 using the power saving mode may implement higher power efficiency compared to the control of the communication circuit 510 using the TWT mode.

In case that the time interval between packets is less than the value assigned to the timer configured in the power saving mode, the control of the communication circuit 510 using the TWT mode may implement higher power efficiency compared to the control of the communication circuit 510 using the power saving mode.

The electronic device 310 may identify a ratio of the time interval that has a value equal to or less than (or less than) a designated magnitude among the time intervals between packets.

The ratio of time intervals may be a ratio of a sum of time intervals equal to or less than (or less than) the designated magnitude to a total sum of time intervals between packets. Alternatively, the ratio of time intervals may be a ratio of the number of time intervals equal to or less than (or, less than) the designated magnitude to the number of time intervals between packets.

In operation 930, the electronic device 310 may determine whether to activate the target wake time (TWT) mode on the basis of the identified ratio.

The electronic device 310 may determine to activate the TWT mode on the basis of identifying that the identified ratio is equal to or greater than (or greater than) the designated value (e.g., 0.5). A situation in which the identified ratio is equal to or greater than (or, greater than) the designated value may refer to a relatively frequent occurrence of a state in which the time intervals between packets is less than the value assigned to the timer configured in the power saving mode. And in case that a state in which the time intervals between packets is less than the value assigned to the timer configured in the power saving mode occurs relatively frequently, the control of the communication circuit 510 using the TWT mode may implement a higher power efficiency compared to the control of the communication circuit 510 using the power saving mode.

The electronic device 310 may determine not to activate the TWT mode (or to disable the TWT mode) on the basis of identifying that the identified ratio is equal to or less than (or less than) the designated value (e.g., 0.5). In case that the TWT mode is not activated, the electronic device 310 may operate in the power saving mode. A situation in which the identified ratio is equal to or less than (or, less than) the designated value may refer to a relatively frequent occurrence of a state in which the time intervals between packets is greater than the value assigned to the timer configured in the power saving mode. And in case that a state in which the time intervals between packets is greater than the value assigned to the timer configured in the power saving mode occurs relatively frequently, the control of the communication circuit 510 using the power saving mode may implement a higher power efficiency compared to the control of the communication circuit 510 using the TWT mode.

In operation 940, the electronic device 310 may control the communication circuit 510 on the basis of whether the TWT mode is activated.

According to an embodiment, the processor 520 may activate the TWT mode, on the basis of identifying that the identified ratio of the time intervals is equal to or greater than (or greater than) the designated value (e.g., 0.5), and control the communication circuit 510 to operate in the TWT mode.

The electronic device 310 may perform TWT negotiation with the external electronic device (e.g., the external electronic device 320 in FIG. 3) to support the target wake time (TWT) function.

The electronic device 310 may generate TWT parameters during the TWT negotiation process. According to an embodiment, the processor 520 may generate the TWT parameters based on the state of the electronic device 310. The state of the electronic device 310 may include at least any one of an amount of data (or, traffic) to be transmitted or received, a quality of service (QoS) requirement, or a contention level of at least any one link of a plurality of links.

The electronic device 310 may generate the TWT parameters including at least one of: the target wake time (e.g., 411 in FIG. 4A) which indicates a point in time of activation of data transmission and/or reception; the TWT durations (e.g., 412-a, 412-b, and 412-c in FIG. 4A) which each indicate a duration in which data transmission and/or reception may be performed; and/or the TWT wake intervals (e.g., 413-a and 413-b in FIG. 4A) which each indicate an interval between a point in time of activation of data transmission and/or reception and a point in time of next activation of data transmission and/or reception.

The electronic device 310 may generate the TWT duration having a relatively long length and/or the TWT wake interval having a relatively short length, on the basis of performing a service that requires relatively high volume of data transfer and relatively low latency. Alternatively, the processor 520 may generate the TWT duration having a relatively short length and/or the TWT wake interval having a relatively long length, on the basis of performing a service that does not require relatively high volume of data transfer and relatively low latency.

The electronic device 310 may transmit the TWT negotiation message including the generated TWT parameters to the external electronic device 320.

The electronic device 310 may select the power saving mode, on the basis of identifying that the identified ratio is equal to or less than (or less than) the designated value (e.g., 0.5), and control the communication circuit 510 to operate in the power saving mode.

The electronic device 310 may control the communication circuit 510 to transmit information indicating that the electronic device 310 is operating in the power saving mode to the external electronic device 320 upon determining not to activate the TWT mode (or disabling the TWT mode). The electronic device 310, while operating in the power saving mode, may activate the communication circuit 510 for some period of time to receive data (or, beacons) transmitted by the external electronic device 320. The external electronic device 320 may store packets to be transmitted to the electronic device 310 in a buffer implemented internally in the external electronic device 320, in response to receiving information indicating that the electronic device 310 is operating in the power saving mode. The external electronic device 320 may transmit a beacon or an action frame to the electronic device 310 that includes information indicating the presence of a packet to be transmitted to the electronic device 310. The electronic device 310 may transition to an active state of the communication circuit 510 (or maintain an active state of the communication circuit 510) upon receiving a beacon or action frame including information indicating the presence of a packet to be transmitted, while the communication circuit 510 is active for some duration.

A situation in which the identified ratio of the time intervals is equal to or less than (or, less than) the designated value may refer to a relatively frequent occurrence of a state in which the time intervals between packets is greater than the value assigned to the timer configured in the power saving mode. And in case that a state in which the time intervals between packets is greater than the value assigned to the timer configured in the power saving mode occurs relatively frequently, the control of the communication circuit 510 using the power saving mode may implement a higher power efficiency compared to the control of the communication circuit 510 using the TWT mode.

An electronic device according to an embodiment may include a communication circuit configured to transmit or receive data over at least one link generated between an external electronic device and the electronic device. The electronic device may include a processor. The processor may identify time intervals between packets that are transmitted or received over the at least one link. The processor may identify a ratio of the time intervals that are equal to or less than a designated value among the time intervals. The processor may select one of a target wake time (TWT) mode in which the communication circuit is switched to an active state every designated time on the basis of the ratio, and a power saving mode in which the communication circuit is switched to an inactive state in case that no transmission or reception of the packets occurs during the designated time. The processor may be configured to control the communication circuit on the basis of the selected mode.

In the electronic device according to an embodiment, the processor may be configured to select the TWT mode on the basis the ratio is equal to or greater than a designated magnitude.

In the electronic device according to an embodiment, the processor may be configured to select the power saving mode on the basis that the ratio is equal to or less than a designated magnitude.

In the electronic device according to an embodiment, the ratio may be a ratio of a length of time intervals that are equal to or less than the designated value to a length of time intervals that are equal to or greater than the designated value.

In the electronic device according to an embodiment, the ratio may be a ratio of the number of time intervals that are equal to or less than the designated value to the number of time intervals that are equal to or greater than the designated value.

In the electronic device according to an embodiment, the designated value may be configured to be equal to the designated time of the power saving mode.

In the electronic device according to an embodiment, the processor may be configured to determine whether to perform an operation of identifying time intervals between packets transmitted or received over the at least one link, on the basis of a type of service running on the electronic device.

In the electronic device according to an embodiment, while the processor is transmitting or receiving packets with the external electronic device over a plurality of links, the processor may identify time intervals between packets transmitted or received over at least some links of the plurality of links. The processor may identify a ratio of a length of time intervals among the time intervals that are equal to or less than the designated value to a length of time intervals among the time intervals that are equal to or greater than the designated value. The processor may select one of the target wake time (TWT) mode and the power saving mode on the basis of the ratio of the time intervals. The processor may be configured to control the communication circuit to allow the at least some links to operate in the selected mode.

In the electronic device according to an embodiment, the processor may select the TWT mode when the ratio is equal to or greater than a designated magnitude. The processor may transmit a negotiation message of the TWT mode to the external electronic device. The negotiation message of the TWT mode may be configured to include information indicating the at least some links.

In the electronic device according to an embodiment, the processor may be configured to select the power saving mode when the ratio is equal to or less than a designated magnitude.

A method of operating an electronic device according to an embodiment of the present disclosure may include identifying time intervals between packets that are transmitted or received over at least one link generated between an external electronic device and the electronic device. The method may include identifying a ratio of time intervals among the time intervals that are equal to or less than a designated value to time intervals among the time intervals that are equal to or greater than the designated value. The method may include selecting one of a target wake time (TWT) mode in which the communication circuit of the electronic device is switched to an active state every designated time based on the ratio, and a power saving mode in which the communication circuit is switched to an inactive state in case that no transmission or reception of the packets occurs during the designated time. The method may include controlling the communication circuit based on the selected mode.

In the method of operating the electronic device according to an embodiment, the selecting of the one mode may include selecting the TWT mode when the ratio is equal to or greater than a designated magnitude.

In the method of operating the electronic device according to an embodiment, the selecting of the one mode may include selecting the power saving mode when the ratio is equal to or less than the designated magnitude.

In the method of operating the electronic device according to an embodiment, the ratio may be a ratio of a length of time intervals that are equal to or less than the designated value to a length of time intervals that are equal to or greater than the designated value.

In the method of operating the electronic device according to an embodiment, the ratio may be a ratio of a number of time intervals that are equal to or less than the designated value to a number of time intervals that are equal to or greater than the designated value.

In the method of operating the electronic device according to an embodiment, the designated value may be configured to be equal to the designated time of the power saving mode.

The method of operating the electronic device according to an embodiment may further include determining whether to perform an operation of identifying time intervals between packets transmitted or received over the at least one link, based on a type of service running on the electronic device.

The method of operating the electronic device according to an embodiment, while the packets are being transmitted or received with the external electronic device over a plurality of links, further include identifying time intervals between packets transmitted or received over at least some links of the plurality of links. The method of operating the electronic device may include identifying a ratio of a length of time intervals among the time intervals that are equal to or less than the designated value to a length of time intervals among the time intervals that are equal to or greater than the designated value. The method of operating the electronic device may include selecting one of the target wake time (TWT) mode every designated time and the power saving mode for the designated time on the basis of the ratio. The method of operating the electronic device may further include controlling the communication circuit to allow the at least some links to operate in the selected mode.

The method of operating the electronic device according to an embodiment may further include selecting the TWT mode when the ratio is equal to or greater than the designated magnitude. The method of operating the electronic device may further include transmitting a negotiation message of the TWT mode to the external electronic device. The negotiation message of the TWT mode may include information indicating the at least some links.

The method of operating the electronic device according to an embodiment may further include selecting the power saving mode on the basis that the ratio is equal to or less than the designated magnitude.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuit configured to transmit or receive data over at least one link that is set up between an external electronic device and the electronic device; and
a processor configured to:
identify time intervals between packets that are transmitted or received over the at least one link;
identify a ratio of time intervals that are equal to or less than a designated value among the time intervals, wherein the ratio is a ratio of a length of time intervals that are equal to or less than the designated value to a length of time intervals that is equal to or greater than the designated value;
select a target wake time (TWT) mode or a power saving mode based on the ratio, wherein in the TWT mode the communication circuit is switched to an active state every designated time, and wherein in the power saving mode the communication circuit is switched to an inactive state in case that the packet is not transmitted or received during a designated time; and
control the communication circuit based on the selected mode.

2. The electronic device of claim 1, wherein the processor is configured to select the TWT mode when the ratio is equal to or greater than a designated magnitude.

3. The electronic device of claim 1, wherein the processor is configured to select the power saving mode when the ratio is equal to or less than a designated magnitude.

4. The electronic device of claim 1, wherein the ratio is a ratio of a number of time intervals that are equal to or less than the designated value to a number of time intervals that are equal to or greater than the designated value.

5. The electronic device of claim 1, wherein the designated value is equal to the designated time of the power saving mode.

6. The electronic device of claim 1, wherein the processor is configured to determine whether to perform an operation of identifying time intervals between packets transmitted or received over the at least one link based on a type of service running on the electronic device.

7. The electronic device of claim 1, wherein while the processor is transmitting or receiving packets with the external electronic device over a plurality of links, the processor is configured to:
identify time intervals between the packets that are transmitted or received over at least part links of the plurality of links;
identify a ratio of a length of time intervals among the time intervals that are equal to or less than the designated value to a length of time intervals among the time intervals that are equal to or greater than the designated value;
select the TWT mode or the power saving mode based on the ratio; and
control the communication circuit to allow the at least part links to operate in the selected mode.

8. The processor of claim 7, wherein the processor is configured to select the TWT mode when the ratio is equal to or greater than a designated magnitude, and transmit a negotiation message of the TWT mode to the external electronic device, and
wherein the negotiation message of the TWT mode includes information indicating the at least part links.

9. The electronic device of claim 7, wherein the processor is configured to select the power saving mode when the ratio is equal to or less than a designated magnitude.

10. The method of operating an electronic device, the method comprising:
identifying time intervals between packets that are transmitted or received over at least one link that is set up between an external electronic device and the electronic device;
identifying a ratio of time intervals that are equal to or less than a designated value among the time intervals, wherein the ratio is a ratio of a length of time intervals that are equal to or less than the designated value to a length of time intervals that are equal to or greater than the designated value;
selecting a target wake time (TWT) mode or a power saving mode based on the ratio, wherein in the TWT mode a communication circuit of the electronic device is switched to an active state every designated time, and wherein in the power saving mode the communication circuit is switched to an inactive state in case that no transmission or reception of the packets occurs during a designated time; and
controlling the communication circuit based on the selected mode.

11. The method of claim 10, wherein the selecting comprises selecting the TWT mode when the ratio is equal to or greater than a designated magnitude.

12. The method of claim 10, wherein the selecting comprises selecting the power saving mode when the ratio is equal to or less than a designated magnitude.

13. The method of claim 10, wherein the ratio is a ratio of a number of time intervals that are equal to or less than the designated value to a number of time intervals that are equal to or greater than the designated value.

14. The method of claim 10, wherein the designated value is equal to the designated time of the power saving mode.

15. The method of claim 10, further comprising:
determining whether to perform an operation of identifying time intervals between packets transmitted or received over the at least one link based on a type of service running on the electronic device.

16. The method of claim 10, wherein packets are transmitted or received to or from the external electronic device over a plurality of links, further comprising:
identifying time intervals between the packets that are transmitted or received over at least part links of the plurality of links;
identifying a ratio of a length of time intervals among the time intervals that are equal to or less than the designated value to a length of time intervals among the time intervals that are equal to or greater than the designated value;

selecting the TWT mode or the power saving mode based on the ratio; and controlling the communication circuit to allow the at least part links to operate in the selected mode.

17. The method of claim 16, further comprising:

selecting the TWT mode when the ratio is equal to or greater than a designated magnitude; and transmitting a negotiation message of the TWT mode to the external electronic device, wherein the negotiation message of the TWT mode includes information indicating the at least part links.

18. The method of claim 16, further comprising:

selecting the power saving mode when the ratio is equal to or less than a designated magnitude.

* * * * *